ELECTRONIC TRANSMITTING DEVICE

Filed Oct. 24, 1965 Sheet 1 of 8

INVENTOR

JACOB L. WALLACE, JR.

BY Tipton D. Jennings

ATTORNEY

Jan. 14, 1969 J. L. WALLACE, JR 3,422,229

ELECTRONIC TRANSMITTING DEVICE

Filed Oct. 24, 1965 Sheet 2 of 8

Jan. 14, 1969 J. L. WALLACE, JR 3,422,229

ELECTRONIC TRANSMITTING DEVICE

Filed Oct. 24, 1965 Sheet 6 of 8

Jan. 14, 1969 J. L. WALLACE, JR 3,422,229

ELECTRONIC TRANSMITTING DEVICE

Filed Oct. 24, 1965 Sheet 7 of 8

United States Patent Office 3,422,229
Patented Jan. 14, 1969

3,422,229
ELECTRONIC TRANSMITTING DEVICE

Jacob Lightsey Wallace, Jr., Springfield, Va., assignor to The Susquehanna Corporation, a corporation of Delaware Filed Oct. 24, 1965, Ser. No. 504,526
U.S. Cl. 179—90 7 Claims
Int. Cl. H04m 1/26

ABSTRACT OF THE DISCLOSURE

A repertory dialer for common use by a group of subscribers has an address card memory store. Logic circuitry provides four modes of call signalling: AC, DC pulse, a combination of AC and DC, and PBX outdialing by way of digit 9. The memory is encoded with specific information as to the mode desired and with the called subscriber's number and area code. AC mode takes two forms, touch tone and multifrequency. Both use dual frequency tones per digit but the latter uses a higher range of frequencies. Better response for long distances.

The present invention relates generally to transmitting devices and is particularly directed to transmitting devices which automatically call an address and thereby eliminate the requirement of manually selecting each digit in the address. When used with automatic telephone systems these transmitting devices are commonly known as repertory dialers.

In automatic telephone systems, it is usually required that the calling subscriber go through the time-consuming operation of manipulating a telephone dial successively a number of times corresponding to the number of digits in the called address. In most locations seven digits comprise an address and each digit must be successively selected on the dial and the dial rotated to transmit the desired number of impulses associated with that particular digit. With the advent of direct long-distance dialing, three additional digits must also be selected on the dial. Obviously, this repeated manipulation is a time-consuming operation and is conducive to errors in dialing. By the use of a repertory dialing device, the necessity of having to select and manually dial each digit of the address or telephone number is eliminated.

In the past, several approaches have been taken in the design of repertory dialers. Attachments to the telephone set have been proposed which attachments physically manipulate the dial for each digit by inserting a member into the appropriate opening of the finger wheel, rotating it the required amount and withdrawing the member to release the wheel. Other dialers use coded discs which rotate to produce pulses similar to dial pulses. Still others use a storage medium such as a drum or tape having magnetic patterns stored thereon which reproduce the dial pulses during readout. All of these dialers employ considerable amount of mechanical equipment which has been found to be necessary to effect operation of these prior art devices.

In copending application, Ser. No. 370,780, now U.S. Patent No. 3,341,666, filed May 28, 1964, by J. Lightsey Wallace, Jr., there is described a novel repertory dialer which features a construction which is primarily electronic except for a limited number of control relays. The dialer described in the aforesaid application generates pulses which operate an interrupter connected in the telephone line being used. The interrupter affects the telephone circuit in the same manner as does the conventional operation of a telephone instrument dial. The result is that dialing pulses occur on the telephone line to operate the centrally located telephone equipment and complete the call. This type of dialing is known as DC dialing because of the DC pulses which appear on the telephone line.

With the advent of AC dialing, telephone equipment is being modified to be compatible with the AC signals which are used. The telephone instrument itself is being provided with ten pushbuttons, each button when depressed causing the generation by the instrument of a pair of AC tones. This is known as Touch-Tone (TT) dialing and is used in local service. For long distance service the technique is called Multi-Frequency (MF) and tone pairs are also used; however, their frequencies are generally higher than the TT frequencies.

Because the repertory dialers presently in use are designed primarily to function with the DC dialing equipment, a need has arisen for repertory dialing equipment which can be used with the AC dialing systems. Accordingly, an object of the present invention is to provide an improved repertory dialer which will generate AC signals which are compatible with AC telephone equipment.

A further object of the invention is to provide an improved repertory dialer which will generate AC tones such as the pairs such as the type used in TT and MF systems.

Another object of the invention is to provide an improved repertory dialer which may be used in conjunction with existing telephone instruments without interfering with the normal operation thereof.

Still another object of the invention is to provide a novel oscillator and frequency selection system for the generation of multiple AC tones such as the plurality of AC tone pairs used to operate the AC telephone equipment.

Another object of the invention is the provision of an improved repertory dialer which can be used with a single telephone instrument or can be common to a plurality of separate telephone instruments to permit individual selection of the addresses within the repertory at the various telephone instrument locations to operate the repertory dialer.

It can be readily seen that a desired address (telephone number) may require a combination of dialing modes such as an intermix of AC and DC dialing. For example, in a PBX installation a DC dialing mode may be required to seize an outside line and an AC mode may be required to complete the address. Additionally, because the transition from AC to DC dialing is not complete, long-distance or even local telephone equipment may entail a combination of dialing modes, e.g., where the area code is on an AC basis and the local exchange is on a DC basis. Therefore, an additional object of the present invention is to provide an improved repertory dialer having multiple dialing modes including apparatus for selecting the proper dialing mode.

A further object is to provide an improved repertory dialer having multiple dialing modes including apparatus for selecting and intermixing the dialing modes in the dialing of a single address.

A still further object of the invention is to provide novel selection apparatus for initiating the operation of the repertory dialer and selecting the desired address from the repertory.

Another object of the invention is to provide a novel tone detecting circuit for use with a repertory dialer to detect seizure of a telephone line.

Other objects and advantages will be seen by a reading of the following description of the invention, taken in conjunction with the accompanying drawings in which.

Broadly, this invention in one aspect comprises a multimode repertory call-selecting apparatus for use in conjunction with an automatic signalling system. The apparatus initiates call selecting or dialing signals upon selection of an encoded address located in a memory or repertory. Means are provided for determining the dialing mode sequence for the digits being dialed, said determining means being enabled upon the selection of the address.

*Multi-mode dialer*

Figure 1:
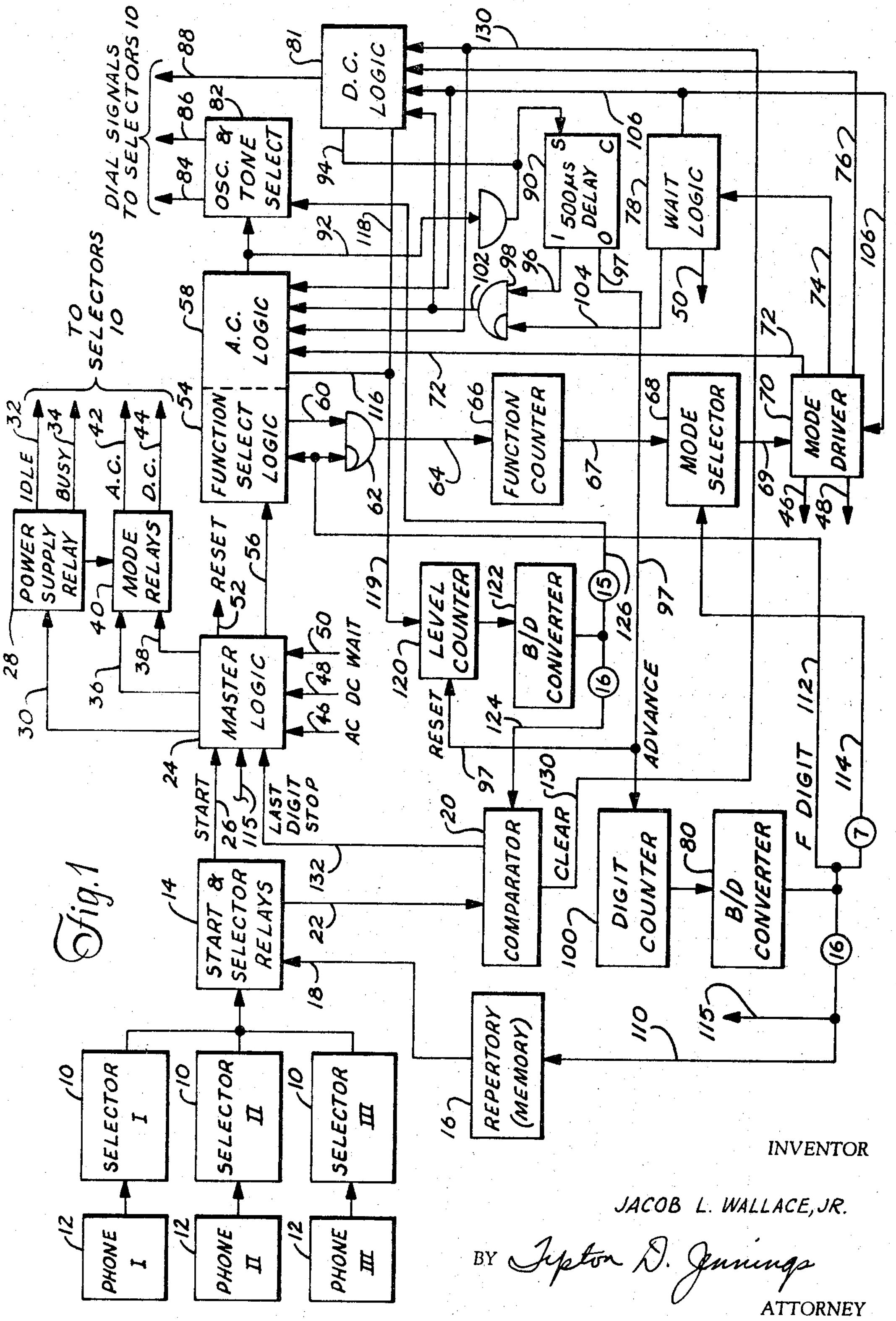
FIGURE 1 is a simplified block diagram of a preferred embodiment of a multimode repertory call-selecting system.

Referring now to the drawings and, in particular, to FIGURE 1, there is illustrated in simplified block diagram form a repertory call-selecting system or dialer having its address repertory and signalling equipment commonly accessible by a plurality of manually operable selectors 10 associated with conventional telephone instruments 12 connected in an automatic telephone system. Any of the selectors 10 when operated causes the actuation of relays in relay bank 14 to select address cards in a repertory 16 by address lines 18. Any selected address is connected through relay bank 14 to a comparator 20 via line 22. The relay bank 14 is also connected to the start input of the master logic 24 by line 26.

Master logic 24 is so named because it is the main control point through which the dialing sequence begins and terminates when an address is selected by the operation of a selector 10. One output of master logic 24 is connected to the power supply relay 28 by line 30 to switch from "idle" line 32 to "busy" line 34 the negative supply which energizes the selectors 10. Lines 36 and 38 lead from master logic 24 to the AC and DC dialing mode relays 40 which control the AC and DC lock-up relays in the selectors 10 by lines 42 and 44, respectively. Aiding in the control of the mode relays 40 are mode inputs shown by input arrows 46, 48 and 50 at the bottom of the master logic block 24. Master logic 24 also generates a master reset signal on line 52 which serves to reset various components of the dialer.

Master logic 24 is also connected to function-select logic 54 by line 56. Function-select logic 54 is shown as a part of AC logic 58 to indicate that these two components share the same logic circuitry. Function-select logic 54 is utilized during the function-select cycle in the establishment of the sequence of dialing modes for the selected address. The output of function-select logic 54 is applied on line 60 to a gated differentiating circuit 62 and from there on line 64 to function counter 66. Function counter 66 is a conventional four-stage binary counter and it is connected to mode selector 68 by lines 67. Mode selector 68 is driven by counter 66 to establish the dialing mode sequence for the selected address. The output of mode selector 68 is connected to the mode driver 70 by lines 69.

Mode driver 70 is here shown, by example, as having three outputs 72, 74, and 76 which are connected respectively to AC logic 58, to Wait logic 78, and to DC logic 80 to prescribe the dialing mode for each digit in the address being dialed. When the AC dialing mode is selected, AC logic 58 activates the oscillator circuit 82 and AC dialing signals are applied to the selectors 10 on lines 84 and 86. When the DC dialing mode is selected, the DC logic 80 applies DC pulses on line 88 to the selectors 10. Mode driver 70 is also connected to master logic 24 by lines 46 and 48 to aid in the operation of mode relays 40.

Line 92 is connected from AC logic 58 to a 500-microsecond delay circuit 90 for applying a signal at the conclusion of an AC dialing cycle for an address digit. Delay circuit 90 is also connected by line 94 to DC logic 80 which applies a signal at the end of a DC dialing cycle for an address digit. Delay circuit 90 is preferably a one-shot multivibrator having as required a standard differentiating circuit and rectifier (not shown) at its set input to form the positive triggering spikes. The output of the delay circuit 90 is applied from the one output position on line 96 to gated differentiator circuit 98. Line 97 connects the zero output to the advance input of digit counter 100 and the reset input of level counter 120. The output of differentiator 98 applies a restart or strobe spike at the end of the 500-microsecond period on line 102 to the AC logic 58 and to the DC logic 80. Gated differentiating circuit 98 receives an inhibit input from Wait logic 78 by line 104. Wait logic 78 is also connected to AC logic 58 and to DC logic 80 by line 106 for applying a restart pulse after a Wait cycle. Line 106 also applies this output to mode driver 70 to clear the Wait mode. Another output from Wait logic 78 is connected to Master logic 24 by line 50 to aid in control of mode relays 40.

Digit counter 100 is a conventional four-stage binary counter whose output is converted by a conventional binary-to-decimal converter 80. Converter 80 has 16 output digit lines 110 which are applied to the input of the repertory 16. These 16 lines include a first line known as the function (F) digit line followed by 15 additional lines, each line corresponding to a digit position of the digits in the addresses. An output line 112 from the converter 80 representing the F or function digit line only is connected to the inhibit input of gated differentiating circuit 62 and into the function select logic 54. Digit lines 114 other than the F-digit line are connected from converter 80 to one input of mode selector 68. The last digit line 115 is connected to master logic 24 to clear same after the maximum number of digits in an address have been dialed.

Outputs from AC logic 58 and DC logic 80 are applied respectively on lines 116 and 118 to line 119 to drive level counter 120 during each digit. This counter is also a conventional four-stage binary counter and its output is converted in the conventional binary-to-digital converter 122. The output of converter 122 comprises sixteen lines 124 representing the levels or counts from zero through fifteen, inclusive. These lines 124 are connected to comparator 20. Fifteen lines 126 representing levels one through fifteen, inclusive, are connected to the oscillator and tone selection circuit 82 to aid in the generation of the AC dialing signals.

The clear output of comparator 20 is connected by line 130 to AC logic 58 and DC logic 80. Comparator 20 is also connected to the stop input of master logic 24 by line 132 to clear the master logic after dialing the last digit programmed in an address and return the repertory dialing apparatus to the idle condition.

In FIGURE 2 there is shown the construction of a selector 10 here being, by example, the selector I associated with telephone I. The remaining selectors 10 are identical in construction to selector I and will be referenced where necessary in the description of the invention. Selector 10 contains a number of pushbuttons 150 which are designed to be located on the exterior of the selector for operation by the calling subscriber. Each pushbutton 150 when actuated selects a particular coded address in the repertory 16.

The pushbuttons 150 are shown as being fifty in number arranged in five rows and ten columns. Each pushbutton 150 has two open contacts, 152 and 154, the movable side of each being connected to the voltage supply line 32. Contact 152 is connected at its stationary side to a units line 156. Each units line 156*a* through 156*j* is connected through a diode 158 to a units line input of relay bank 14. Except in the first row of selector buttons 150, the stationary side of each contact 154 is connected to a tens line 160. Each of the four lines 160*a* through 160*d* is connected to a diode 162 which leads to a tens line input of relay bank 14. In the first row of selector buttons 150 the stationary side of contact 154 is connected to a line 164 which is in turn connected to a diode 166. Additional diodes 166 are also connected to tens lines 160 in each of the remaining rows of selectors. Diodes 166 are commonly connected to line 168 leading to the start relay in the relay bank 14.

Each units line 156 is also connected to a common line 170 by a diode 172. Line 170 terminates within the selector 10 at line 174 which is connected to winding 176 of relay 175, to contacts 1 and 3, and to dialing lamp 178 and diode 180. Winding 176, diode 180, and dialing lamp 178 provide a path to ground. Busy lamp 182 is connected between ground and contact 1 of relay 175. Reset switch 184 when actuated connects ground to contact 2 of relay 175. Input line 34 is connected to contact 1 of relay 175 and manual reset line 188 is connected to contact 2 of this relay. The output of contact 3 of relay 176 is connected to line 190 which in turn is connected to winding 192 of relay 193, in shunt with diode 194. Line 44 leads from winding 192 to the DC mode relay. Line 190 is also connected to the contact 2 of relay 193, and to the winding 196 of relay 197 and shunt diode 198, this latter circuit being completed through line 42 leading to the AC mode relay.

Contact 1 of relay 193 is the shunt contact for blanking dialing clicks from the hearing of the subscriber and it is connected to the telephone I, shown schematically, by lines 200 in parallel with the normally open shunt contacts in the dial of telephone I. The output of contact 2 of relay 193 is connected to one side of winding 202 of relay 203 and shunt diode 204 by line 206. The other side of this winding and diode is connected to line 88 leading to DC logic 80 (FIGURE 1). Relay 203 is the pulse relay for DC dialing and its closed contact is connected to the telephone I by lines 208 in series with the normally closed pulse contact of telephone dial I.

The contact of relay 197 normally shorts the secondary of transformer 210. The primary of this transformer is connected by lines 84 and 86 to the output of oscillator circuit 82 (FIGURE 1). The normally closed contact of relay 197 also completes by lines 212 a series circuit for the line of telephone I. Line 214 leads to the open position of this contact. When the contact is switched by the operation of relay 197, the secondary of transformer 210 is placed in the line circuit of telephone I via lines 212, and line 214 completes the circuit by shorting out the telephone I. The afore-described output connections show how the subscriber may use the repertory dialer in either the DC or AC mode without interfering with the normal operation of the dial telephone.

The inputs to relay bank 14 are connected to a start relay and a relay matrix. Line 168 leads to the start relay winding 216 which, when actuated, puts ground on line 26 leading to the start input of master logic 24. The remaining lines from the selectors lead to the relay matrix shown. Each units line 156 is connected to a relay winding 218. Each tens line 160 is connected to a relay winding 220. These units and tens relays are arranged in columns and rows to form the matrix. The relay matrix has ten columns 222 of contacts, each column being headed by an open contact controlled by one of the units relay windings 218. The remaining contacts in each column are normally closed and form four aligned rows of contacts, each row being gang-controlled by a tens relay winding 220. Each of these latter contacts when actuated by a relay 220 switch to a position connecting them to a line 18 leading to an address in repertory 16. These latter positions are for convenience in description numbered to correspond to the addresses in the repertory and to the numbers of the selector buttons 150. The end of each column 222 is connected also to a line 18 leading to an address in repertory 16. These last ten lines are numbered one through ten to correspond to the like-numbered address and selector buttons. The head of each column 222 is commonly connected to line 22 leading to comparator 20. Relay windings 216, 218, and 220 each have second contacts which close when its winding is energized to hold the relay in an energized state. These contacts are commonly connected to busy line 34.

Depression of a button 150 in a selector 10 will cause an address in repertory 16 to be connected to comparator 20. For example, if button S1 in Selector I is depressed, current flows from line 32 through contact 152 of button S1, units line **156*a*, diode 158, into relay winding 218*a* in bank 14 and to ground. The contact associated with winding 218*a* in the leftmost line 222*a* closes. Because none of the tens relays 220 have been actuated, their contacts remain closed and address No. 1 in repertory 16 is connected by its line 18 through column 222*a* to line 22 and out to comparator 20. If button S12 is depressed instead of button S1, current from line 32 flows through contacts 152, 154 of button S12 and follows two paths. One path leads from contact 152 through units line 156*b*, diode 158, relay winding 218*b*, and to ground. The other path leads from button 154 through tens line 160*a*, diode 162, tens relay winding 220*a* and to ground. Winding 218*b* closes its contact in the second column 222*b* of the matrix. Winding 220*a* opens all of its contacts in the fourth row to the address positions numbered eleven through twenty. However, only address No. 12 in repertory 16 is connected through its address line 18 to line 22 and from there to the comparator 20 because only the second column 222*b*** of the matrix affords a closed path.

Depression of any selector button 150 applies simultaneously with the supply of current to operate the relay matrix, current to line 168 and start relay winding 216. In the top row of selector buttons this is achieved by current flow from line 32 to contact 154 of the depressed button 150, to line 164, diode 166 and line 168. In the remaining selector rows, current flows from line 32 to contact 154 of the depressed button 150, through the appropriate line 160 and diode 166 to line 168.

Supply lines 32 and 34 terminate in power supply relay 28 at contact one. Winding 224 is energized when ground appears on line 30. They relay contact 1 then shifts from the idle position shown to the busy position whereby the negative voltage supply is removed from the normal supply line 32 and placed on "busy" line 34. Contact 2 of relay 28 also supplies negative voltage to the mode relays 40 when winding 224 is energized. Relay 28 is preferably of the make-before-break type to ensure that voltage is always on either line 32 or 34. Mode relays 40 contain two windings 226 and 228 which are energized when a ground path is provided on lines 36 and 38, respectively. Winding 226 is energized during the AC dialing mode at which time it switches line 42 to ground. Winding 228 is energized during the DC dialing mode at which time it switches line 44 to ground.

Figures 3, 4, 5:
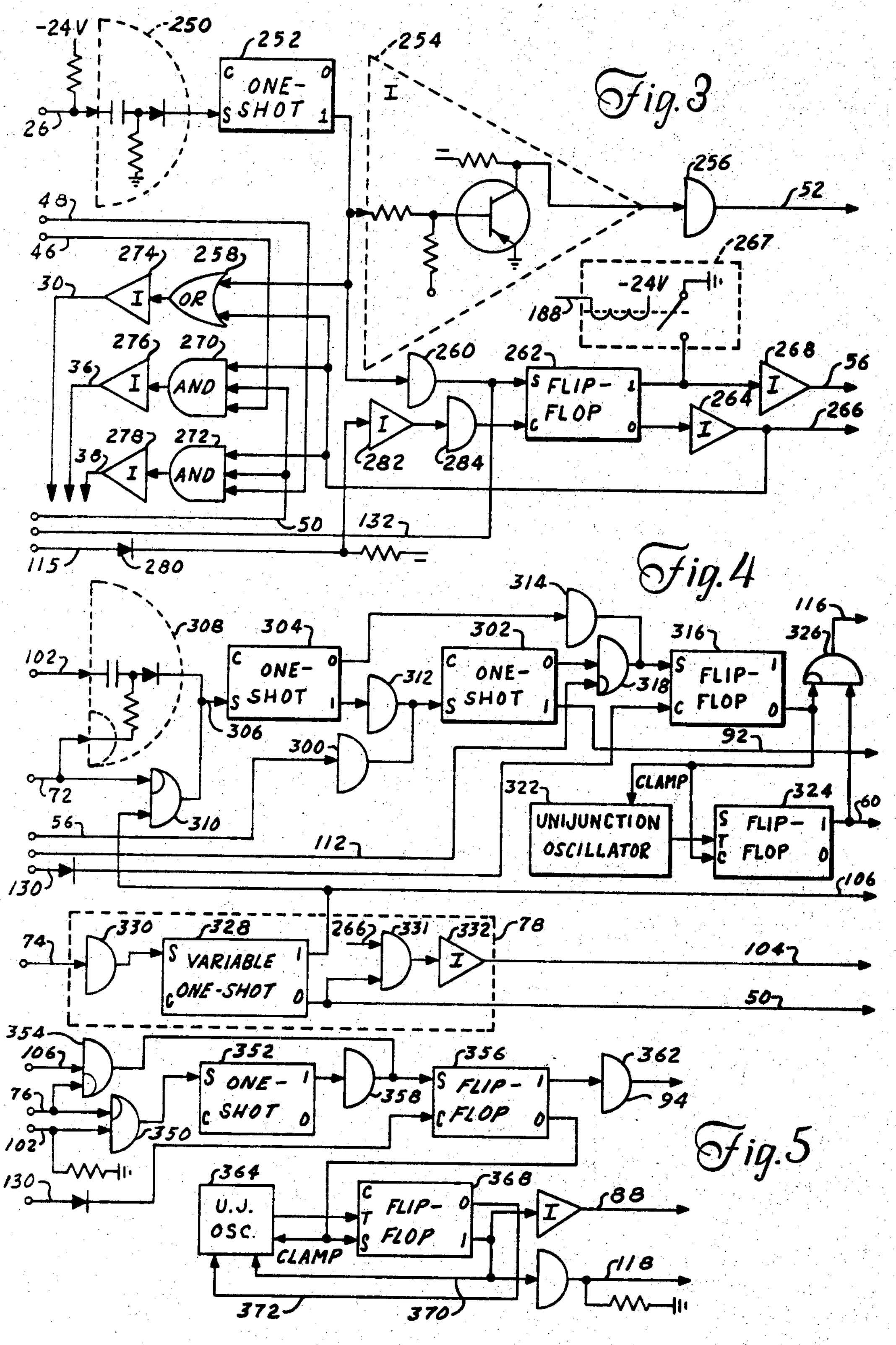

FIGURE 3 shows the construction of the master logic 24. Start-line 26 from the start relay is connected to the input of differentiating circuit 250 which is shown in schematic form as including also a rectifier for passing positive spikes only. This is the construction of all differentiators used in this description. The output is applied to the set input of an eight-millisecond conventional one-shot multivibrator 252. The one output of one-shot 252 is applied to an inverter 254 whose output is applied in turn to a differentiating circuit 256. A sample inverter schematic is shown. As used in this description all inverters give a ground output for a negative input and a negative output for a ground input. The output of differentiating circuit 256 is connected to the master reset line 52. The one output of one-shot 252 is also applied to OR gate 258 and to another differentiating circuit 260. The output of this last differentiating circuit is connected to the set input of flipflop 262. For the one-shots and flip-flops used in this description, the zero output is negative when clear and ground when set and the one output is ground when clear and negative when set.

The one output of flip-flop 262 is applied to inverter 268 whose output is connected to line 56 leading to function select logic 54. The zero output of flip-flop 262 is connected to inverter 264 whose output is connected to OR gate 258 and to two AND gates 270 and 272. OR gate 258 gives a negative output when a negative potential is present at either input. Line 50 from Wait logic 78 is connected to a second input of these two AND gates. Line 46 from mode driver 70 is connected to a third input of AND gate 270, and the line 48 from mode driver 70 is connected to a third input of AND gate 272. The output of OR gate 258 is connected to line 30 through inverter 274 and leads to power supply relay 28. AND gates 270 and 272 are the AC mode gate and DC mode gates, respectively. Their outputs are connected to inverters 276 and 278 and from there are connected to output line 36 and 38 leading to mode relays 40. AND gates 270 and 272 and the remaining AND gates described herein are constructed to give a negative output when all inputs are negative and a ground output at all other times.

Line 188 from contact 2 of relay 176 in the selectors 10 (FIGURE 2) terminates at relay 267. For manual reset during dialing, switch 184 in the operating selector 10 is depressed to apply a ground path for this relay circuit. The contact of relay 267 grounds the one output of flip-flop 262 and returns this flip-flop to the clear state. The last-digit-stop input for clearing flip-flop 262 is in the form of a negative signal which arrives on line 132 and is applied to the set input of flip-flop 262. Of the sixteen digit lines 110 out of converter 80, the sixteenth line is connected by line 115 to diode 280 which is in turn connected to inverter 282. The output of inverter 282 is applied to differentiator 284 whose output is applied to the clear input of flip-flop 262. Line 266 provides an additional output path for the signal from inverter 264. This line is at negative potential during operation of the dialer and is applied to selected AND gates outside of Master logic 24. Line 266 goes to ground when dialing is terminated and this positive signal is used as an input (not shown) to AC logic 58, DC logic 80, and wait logic 78 to ensure that all one-shot multivibrators and flip-flops are immediately cleared, when dialing is terminated.

FIGURE 4 shows the construction of the function select logic 54 and the AC logic 58 and also shows the construction of the Wait logic 78. The function start input on line 56 is connected through differentiating circuit 300 to the set input of one-shot 302 whose duration is 40 milliseconds (ms.). Another 40 ms. one-shot 304 has connected to its set input by line 306 the output of two gated differentiating circuits 308 and 310. The construction of the gated differentiating circuits used herein is shown schematically at 308. It is seen that it is identical to the standard differentiator previously described except for the inhibit input. A negative inhibit input level prevents the functioning of the differentiator. When the inhibit input is at ground the differentiator functions normally. The inhibit input of these two differentiating circuits is applied by mode driver 70 on AC mode line 72. The main input to differentiator 308 is applied by the strobe input on line 102 coming from the 500-microsecond delay circuit 90. The main input to differentiator 310 is received from Wait logic 78 on line 106.

The one output of one-shot 304 is applied to differentiator 312 whose output is in turn connected to the set input of one-shot 302. The zero output of one-shot 304 is differentiated at 314 and is applied to the set input of flip-flop 316. The zero output of one-shot 302 is also applied to the set input of flip-flop 316 by way of a gated differentiating circuit 318. The inhibit input of this differentiator is connected to the F digit line 112 from converter 80 to open this gate during the function select cycle. The one output of one-shot 302 is applied by line 92 to oscillator circuit 82 and the 500-microsecond delay circuit 90. The line 130 from comparator 20 is applied to the clear input of flip-flop 316.

Flip-flop 316 controls a conventional unijunction oscillator 322 by virtue of a negative clamp normally applied from the zero output of flip-flop 316. When the clamp is removed unijunction oscillator 322 becomes free-running and emits a triggering spike every millisecond. These spikes are applied to the toggle input of flip-flop 324 to change the state of this flip-flop every millisecond. The clear input of flip-flop 324 is also clamped by the zero output of flip-flop 316 to ensure that this flip-flop is in the set state prior to receipt of the unijunction output. The output of flip-flop 324 is taken from the one side and is a square wave having a period of two milliseconds, each cycle beginning with a negative half-wave and terminating with a positive half-wave. This output is applied to gated differentiating circuit 326. The output of differentiator 326 is a series of positive spikes, each spike occurring when flip-flop 324 is toggled to the clear state which occurs half way through each cycle. Thus the first output of differentiator 326 occurs one ms. after flip-flop 316 is set and every two ms. thereafter until flip-flop 316 is cleared. This output is applied by line 116 to level counter 120. The inhibit input of differentiator 326 is connected to the zero output of flip-flop 316.

The one output of flip-flop 324 is also connected by line 60 to the gated differentiating circuit 62 (FIGURE 1) whose output is connected to function counter 66. During the function select cycle, the function counter 66 receives positive spikes in unison with level counter 120 and both counters count simultaneously.

Wait logic 78 is also shown in FIGURE 4 and it comprises primarily a conventional one-shot multivibrator 328 having a variable time period of from 1 to 5 seconds to delay, during the dialing procedure, the dialing of the next digit in an address to permit an event to occur. An example of such an event would be the seizing of an outside line when dialing through a PBX. One-shot 328 is set by an input signal arriving on line 74 from mode driver 70 through differentiator 330. The one output of this one-shot is connected to line 106 leading to the differentiator 310 in AC logic 58 and to the DC logic 80. The restart signal is applied on this line at the end of the prescribed Wait period. The zero side of one-shot 328 is connected to the AND gates 270 and 272 in master logic 24 (FIGURE 3) by line 50. This same side is also connected by AND gate 331 and inverter 332 to line 104 on which is applied the inhibit input to differentiator 98. The second input to AND gate 331 is received on line 266 from master flip-flop 262. Line 266 is at negative potential when the dialer is busy, but goes to ground immediately when dialing terminates, ensuring that differentiator 98 is inhibited.

FIGURE 5 shows the construction of the DC logic circuit 80. The strobe input from the 500 microsecond delay circuit 90 is connected by line 102 through gated differentiating circuit 350 to the set input of one-shot multivibrator 352. This one-shot has a duration of 600 ms. which establishes the interdigit delay time between digits when dialing in the DC mode. The inhibit input of differentiator 350 is connected by line 76 to the DC mode output of mode driver 70. Line 76 which is at ground when in the DC dialing mode, is also connected to the inhibit input of a second differentiating circuit 354. The main input to differentiator 354 is connected by line 106 to the restart output of Wait logic 78. The output of this differentiator is connected to the set input of flip-flop 356. This set input is also connected to the one output of one-shot 352 via differentiating circuit 358. Line 130 supplies the clear output of comparator 20 to clear side of flip-flop 356.

Figure 2A:
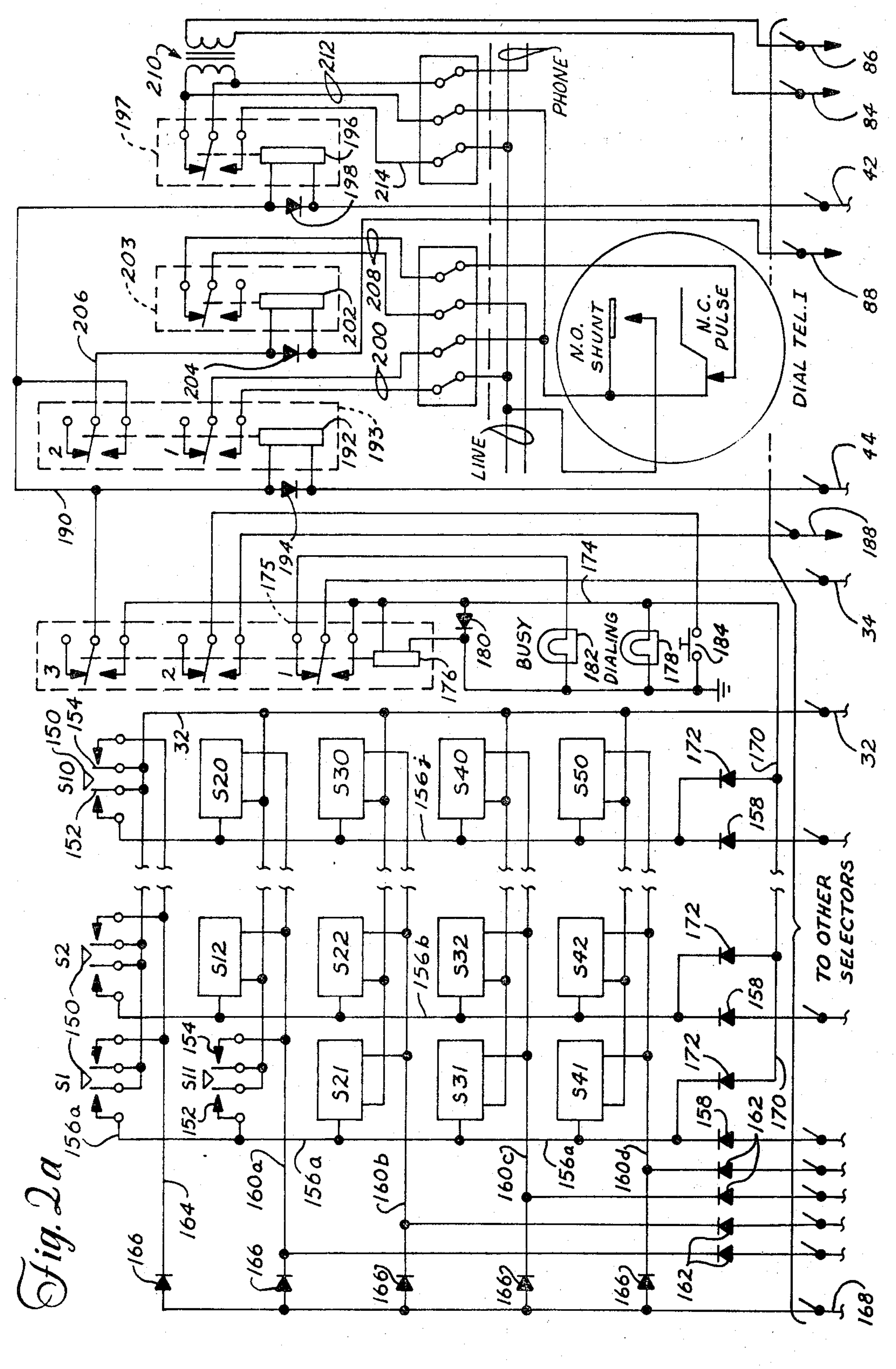
FIGURES 2 through 8 are schematic and logic diagrams of the construction of various components shown in the system of FIGURE 1.
Figure 2B:
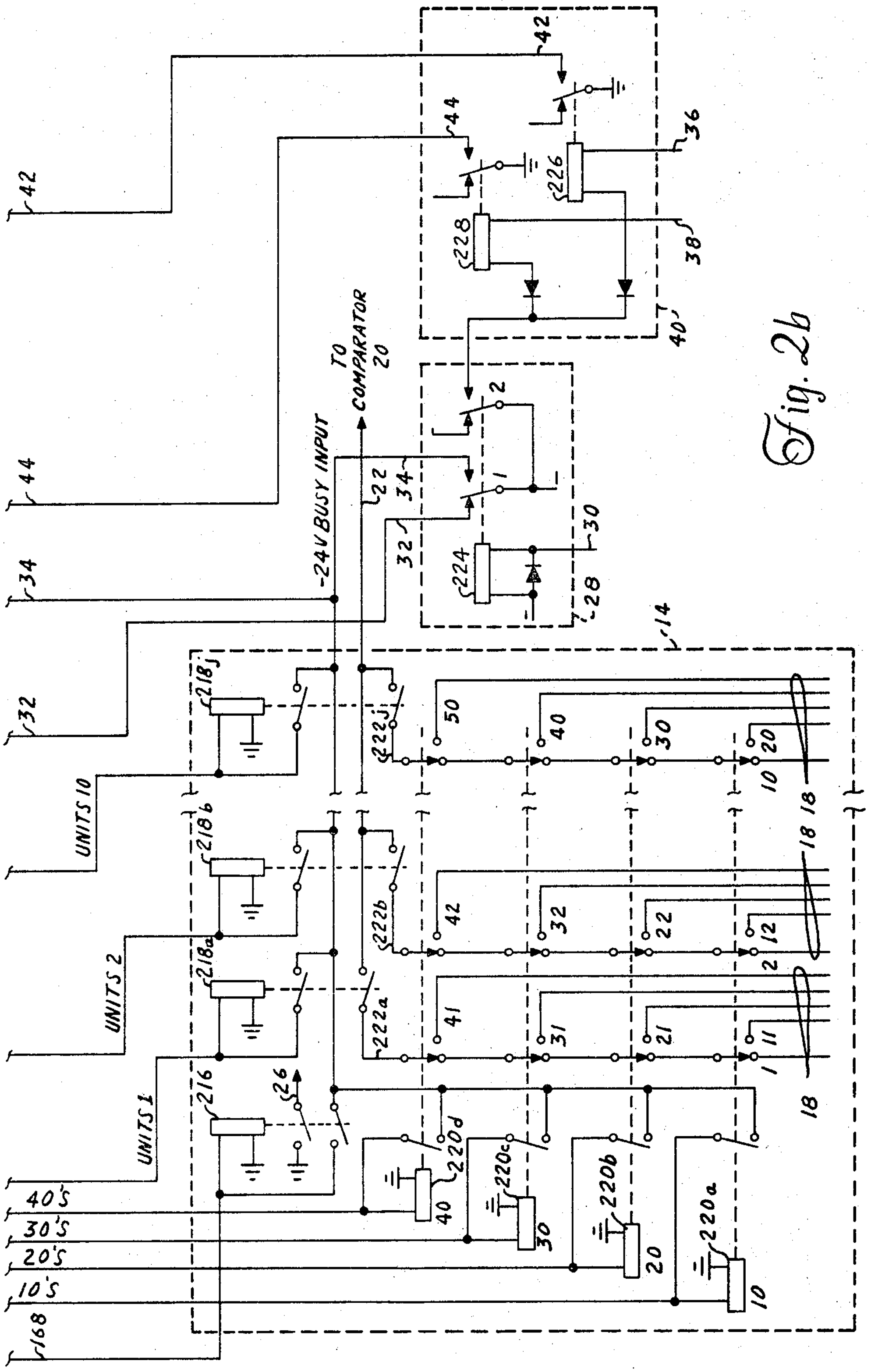

The one output of flip-flop 356 is connected by differentiator 362 to line 94 leading to the set input of 500-microsecond delay circuit 90. The zero output of flip-flop 356 is connected to the clamp input of unijunction oscillator 364 and to flip-flop 368. The output of unijunction oscillator 364 is connected to the toggle input of flip-flop 368. The outputs of flip-flop 368 are connected by lines 370 and 372 to the timing inputs of unijunction oscillator 364 to assist in the control of the firing time of this oscillator. The detailed construction of unijunction 364 and flip-flop 368 can be found in FIGURE 3 and the specification of aforementioned patent application Ser. No. 370,780, now U.S. Patent No. 3,341,666. As described, the make-break ratio of the output pulses can be changed as desired. During operation, flip-flop 368 begins in the clear state because of the negative clamp to the set side from flip-flop 356 and the one output is at ground potential signifying a make condition. Assuming a 40–60 make/break ratio and a 100 ms. period, 40 ms. later unijunction 364 toggles flip-flop 368 to the set position and the one output goes negative, and the output is in the break condition. Thus, the break condition does not occur until 40 ms. after oscillator 364 is released. Sixty milliseconds later, another toggle input is applied to flip-flop 368 and the one output returns to the make condition. The one output of flip-flop 368 is inverted and applied to line 88 leading to the pulse relays 203 in selectors 10 (FIGURE 2*a*). During the make condition line 88 is negative and during the break condition line 88 is at ground. This break condition thus completes a circuit path for winding 202 in the actuated selector 10 to interrupt or break the telephone line by opening the contact of relay 203.

The one output of flip-flop 368 is differentiated and applied to level counter 120 by line 118 to give a positive spike to drive this counter each time flip-flop 368 goes from the break to the make condition. Since a DC dialing pulse is defined by a break condition followed by a make condition, the counter 120 counts in synchronism with the dialing pulses transmitted on the line.

Figure 6:
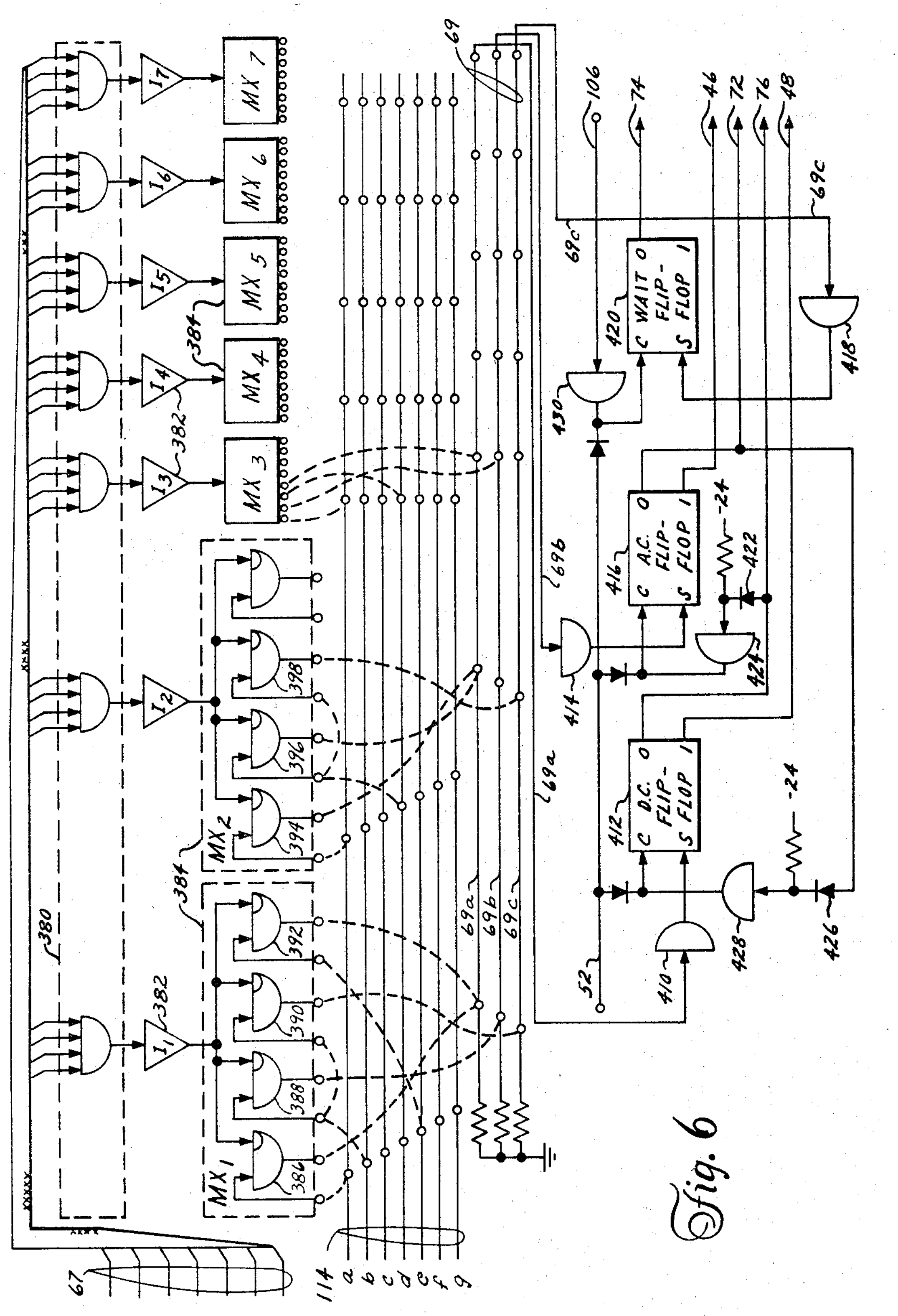

The mode selector 68 is shown in FIGURE 6. This circuit determines by the Function digit the dialing mode sequence for any selected address. For example, the dialing may be all AC mode, all DC mode, either of the former with the Wait mode, or a mix of all modes. The output of function counter 66, which is a conventional binary counter, is connected to a conventional binary-to-decimal converter 380 by lines 67. Converter 380 comprises seven AND gates, the output of each gate being connected to a separate inverter circuit 382. These inverter circuits are numbered I1 through I7 for convenience.

The output of any inverter circuit is normally at negative potential but will go to ground when the count corresponding to its number is attained by function counter 66. For example, for the count of one in function counter 66, the output of the first AND gate of converter 380 goes negative and the output of inverter I1 goes to ground. For the function count of two, the output of inverter I1 becomes negative again and the output of inverter I2 now goes to ground because the output of the second AND gate in converter 380 is now at negative potential. For the function count of three, only the output of inverter I3 is at ground, and so forth through the count of seven when I7 output goes to ground. If additional stages are desired, the converter 380 is extended to provide an output through the function count of sixteen and the necessary additional inverters added; however, it has been found that seven gates are generally sufficient to provide the necessary number of dialing mode sequences.

Each inverter 382 is connected to one of seven identical matrices 384. Each matrix 384 is formed, by example, of four gated differentiating circuits, as shown by the matrices one and two. The output of the associated inverter 382 is connected to the inhibit inputs of these differentiators.

Digit lines 114 from converter 80 are connected into the mode selector circuit 68 as bus lines **114*a* through 114*g* corresponding to the first seven digit lines following the Function digit line. The output of mode selector 68 is taken from three buses 69 corresponding to the three different dialing modes, namely, DC, AC, and Wait. These three outputs are applied to mode driver 70. To determine the dialing mode sequences for the function digits of the addresses in repertory 16, the inputs and outputs of matrices 384 are strapped, respectively, to the digit line buses 114 and mode buses 69**.

Three examples of strapping are shown for the first three matrices 384. The strapping associated with matrix 1 permits the dialing of one DC digit, followed by a Wait period, followed next by three AC digits and then concluded by DC dialing for the remaining digits. As shown, this is accomplished by strapping the first digit line **114*a* to the input of gated differentiating circuit 386 and strapping the output of this circuit to DC bus 69*a*. The second digit line 114*b* is connected to the inputs of differentiators 388 and 390, the output of differentiator 388 being connected to the AC bus 69*b* and the output of differentiator 390 being connected to the Wait bus 69*c*. The fifth digit line 114*e* is connected to the input of differentiator 392 and the output of this last differentiator is connected to the DC bus. Thus, any address in repertory 16 which is to be dialed in this mode sequence will have the digit "one" programmed as its Function digit. If any such address is selected, the function counter 66 counts to 1 during the function select cycle and holds that count. The output of inverter 1 in mode selector 68 goes to ground removing the inhibit input from the gated differentiating circuits in matrix 1 and permitting the dialing digits to be dialed out in the mode sequence established by the strapping associated with matrix 1. Matrix 1**, as strapped, finds particular utility in a PBX where an output line is seized by DC dialing the digit 9. A Wait period follows until the dialing tone is received and then the local number is dialed.

In some PBX three DC digits must be dialed to seize an output line and then the subscriber must wait until a dial tone is attained before dialing the remaining digits. Matrix 2 is strapped to function in this manner. The first digit line **114*a* is connected to the input of differentiator 394, the output being strapped to the DC mode bus 69*a*. The first three digits will be dialed out DC. The fourth digit line 114*d* is strapped to differentiators 396 and 398. The output of differentiator 396 is connected to the DC bus and the output of differentiator 398 is connected to the Wait mode bus 69*c*. Thus, any address which requires this type of dialing mode sequence will have its F digit programmed as digit "two." If such an address is selected by a subscriber, the function counter would, during the F digit, count to two and hold to permit the remaining digits to be dialed out in the mode sequence strapped at matrix 2**.

Another example of a dialing mode sequence is shown in the strapping of matrix 3. Here the first digit line **114*a* is strapped to the input of the first differentiator (not shown) and the output is connected to the AC mode bus 69*b*. The fourth digit line 114*d* is strapped to the input of another differentiator (not shown) whose output is in turn strapped to DC mode bus 69*a*. Matrix 3 thus permits the first three digits to be dialed out on an AC basis and the remaining digits dialed out on a DC basis. This arrangement may find particular utility in direct distance dialing where the three digits comprising the area code are dialed out on an AC basis and the remaining seven digits representing the local number are dialed out on a DC basis. Any address in repertory 16 having its Function digit programmed as the digit "three" would permit function counter 66 to count to the level of 3 and stop for the remainder of the address so that the dialing mode sequence would be as strapped in matrix 3 of mode selector 68. Thus, the mode code 68** can be prestrapped for any desired dialing mode sequence although, practically speaking, seven different dialing mode sequences are sufficient to meet the demands of most dialing systems.

Note that, as shown here, only the first seven digit lines 114 are shown as capable of being strapped to the matrices 384. This is because it has been found that by the time the seventh dialed digit of an address is reached, any remaining digits in the address will usually be in the same dialing mode as the seventh digit. If it takes more than seven digits to establish the complete mode dialing sequence of any address, then additional digit lines are brought into mode code 68 from converter 80 and a bus provided to permit the additional digit line or lines to be strapped into the pertinent matrices 384.

The output of mode selector 68 is applied on lines 69 to mode driver 70. The DC mode input is connected to differentiator 410 and then to the set input of DC mode flip-flop 412. The AC mode input is connected to differentiator 414 and then to the set input of AC mode flip-flop 416, and the Wait mode input is connected to differentiator 418 and then to the set input of Wait mode flip-flop 420. The master reset line 52 is connected to the clear inputs of these last three flip-flops.

The zero output of flip-flop 412 is connected to line 76 leading to the DC logic 80. This output is also connected through diode gate 422, to differentiator 424 and from there to the clear input of AC mode flip-flop 416. When flip-flop 412 is set gate 424 clears flip-flop 416. The one output of flip-flop 412 is connected to line 48 leading to master logic 24. The zero output of AC mode flip-flop 416 is connected to line 72 leading to AC logic 58. This output is also connected to diode gate 426 connected to differentiator 428, whose output is in turn connected to the clear input of DC mode flip-flop 412. When flip-flop 416 is set gate 428 clears flip-flop 412. The one output of flip-flop 416 is connected to line 46 leading to master logic 24. The zero output of Wait mode flip-flop 420 is connected to line 74 leading to Wait logic 78. The restart line 106 coming from Wait logic 78 is connected to the clear input of flip-flop 420 by way of differentiating circuit 430. Other mode flip-flops can be added and the matrix expanded to accommodate other types of dialing modes.

Figure 7:
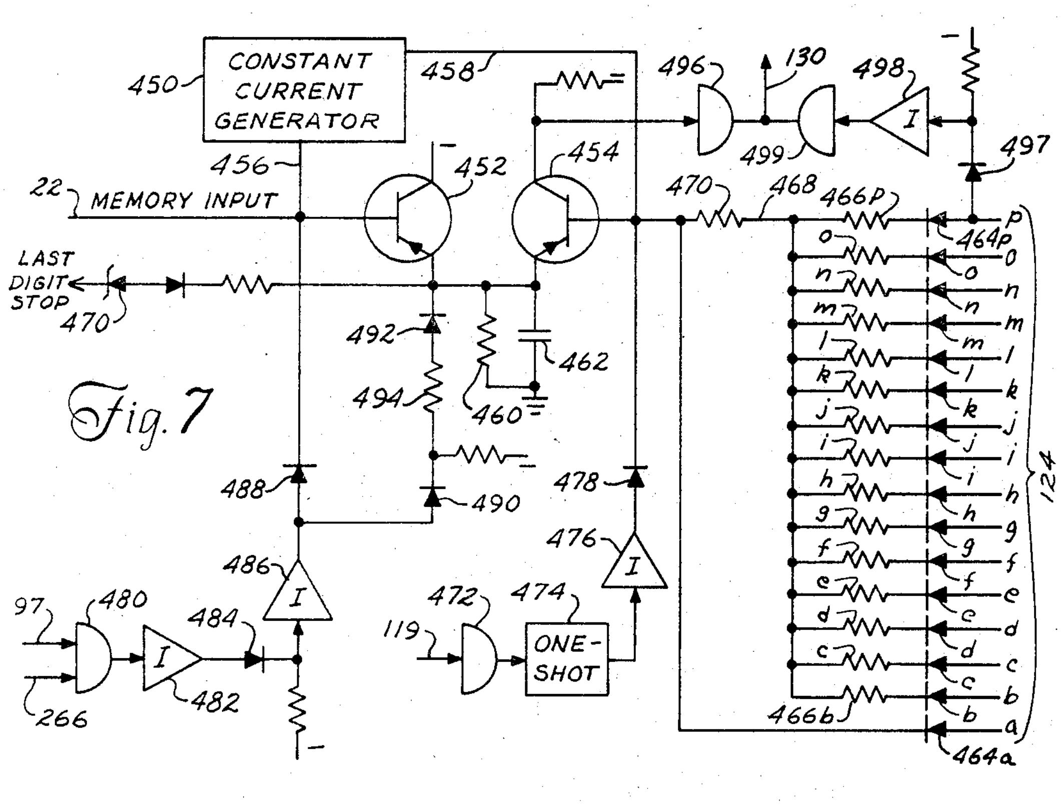

In FIGURE 7 there is shown the construction of the comparator 20, it being basically a balanced differential circuit which establishes the memory voltage input, based upon digit resistance in memory 16, and compares it with the voltage input of converter 122. Constant current generator 450 is connected to the base of transistor 452 and transistor 454 by lines 456 and 458, respectively. The emitters of these two transistors are commonly connected to ground by resistor 460 and capacitor 462. One input to the comparator is applied from the repertory or memory 16 through the selector relays 14 to the base of emitter follower transistor 452 by line 22. The other input to the comparator is applied to the base of transistor 454 on the level lines 124 from converter 122.

Level line 124*a* is connected directly to the base of transistor 454 by diode 464*a*. The remaining level lines 124*b* through 124*p* are connected through a diode 464 and a precision resistor 466 to a common line 468 and from there to the base of transistor 454 through a precision resistor 470. The resistors 466*b* through 466*p* form a resistive ladder and are proportionately increased in their value of resistance. The constant current flowing through line 458, resistor 470, and sequentially through one of the resistors 466*b* through 466*p*, provides equal voltage steps to the base of transistor 454 as level lines 124*b* through 124*p* are sequentially grounded during operation of the level counter 120.

The emitters of transistors 452 and 454 are also connected to line 132 by a Zener diode 470 to provide a stop input to master logic 24 after the dialing of the last digit in an address. Additionally, comparator 20 is provided with two circuits which prevent undesirable transients or other circuit conditions from adversely affecting the operation of the dialer. In one circuit, input line 119, on which is applied the input signal to level counter 120 (FIGURE 1), is connected to a differentiating circuit 472 whose output fires a ten-microsecond one-shot multivibrator 474. The output of this one-shot is connected to inverter circuit 476 and the output of this inverter circuit is connected to the base of transistor 454 by diode 478. In this manner during the advance of the level counter 120 the base of transistor 454 is clamped to ground for ten microsecond to ensure that a complete circuit path is provided for the constant current supply in line 458 and thereby prevent the base of transistor from rising inadvertently to negative supply and triggering the comparator.

In the other circuit, an AND gate 480 is provided with two inputs. One input line 97 is connected from the 500-microsecond delay circuit 90 (FIGURE 1) and the other input line 266 is connected from the flip-flop 262 in master logic 24. The output of AND gate 480 is connected to inverter 482 whose output is in turn connected through diode 484 to a second inverter 486. The output of inverter 486 is normally at negative potential, back-biasing diodes 488 and 490. Diode 388 is connected to the base of transistor 452. Diode 490 is connected to the emitters of the transistors 452 and 454 by a second diode 492 and a resistor 494 which provide a slight voltage drop during operation of this special circuit to keep the base of transistor 452 less negative than the emitter. Resistor 494 is quite small in comparison to the resistance of resistor 460 and is about 40 ohms.

When the repertory dialer is not in use the output of inverter 486 is at ground and both the base and emitter of transistor 452 are clamped to approximately ground. No charge can accumulate on capacitor 462. When the dialer is operated, line 266 goes negative and since line 97 out of differentiator 90 is also negative, AND gate 480 passes a negative signal to inverter 482. The output of this inverter goes to ground and inverter 486 goes nonconducting. Its output rises to negative battery, back-biasing diodes 488 and 490 and thereby removing the clamp. During operation of the dialer when comparator 20 emits a signal on line 130 to clear either the AC or DC logic and delay circuit 90 is then triggered, line 97 goes to ground for 500-microseconds, closing gate 480 for this period. Inverter 482 cuts off and its output goes negative. The output of inverter 486 goes to ground, forward-biasing diodes 488 and 490, and clamping the base and emitter of transistor 452 to approximately ground for 500-microseconds. Diode 490 offers a fast discharge path for any charge on capacitor 462. Diode 488 ensures a circuit path to ground for the constant current supply to prevent the base of transistor 452 from rising to negative supply.

The output of the comparator 20 is obtained from line 130 which is supplied by two paths. The main output path is from the collector of transistor 454 through differentiator 496 which is utilized when the comparator operates in response to level counts 1 through 15. For the level count of 16, which is here the highest level count attainable, an output is provided from level line 124*p* by way of diode 497, inverter 498, and differentiating circuit 499 to line 130.

The repertory 16 shown in FIGURE 1 is preferably a resistive memory. The memory can be arranged as a number of plug-in card components, each card containing a plurality of encoded telephone addresses. An example of resistive encoded addresses is shown in patent application Ser. No. 455,724 filed May 14, 1965 by J. Lightsey Wallace, Jr. In that application each address contains a number of code elements corresponding to the number of digits in the address. Each code element contains a resistor and diode connected in series, which will be referenced in the ensuing discussion.

In the present invention the first code element corresponds to the function or F digit and it precedes the remaining code elements which correspond to what are called dialing digits in contrast to the function digit. Converter 80 shown in FIGURE 1 has 16 output lines 110 which are applied to repertory 16. Converter 80 functions as a shift register to sequentially ground each line 110 and therefore each digit in an address in response to the advance of digit counter 100. When digit counter 100 is reset, the first digit line, which is here defined as the F digit line, goes to ground and ground is applied to all coded F digit elements in the addresses of repertory 16. When the digit counter 100 advances one count, digit line 1 goes to ground and ground is applied to all of the first coded dialing digit elements in repertory 16. This procedure can continue through a maximum of fifteen dialing digits. However, only one address is selected and read out at any one time.

The selection of the desired address is, as was previously explained, by depression of a selector button 150. This actuates the selector relays to complete a circuit from an address in repertory 16 to line 22 leading to comparator 20. In the aforementioned application Ser. No. 455,724, the contacts 56, 58, 60 and 62 shown therein correspond here to the selector relay contacts which select the desired address. When an address is selected, successive grounding of the output digit lines 110 during operation of the dialer sequentially forward-biases the diode in each code element, and the resistor in each code element is sequentially applied to the base of transistor 452 of comparator 20 shown in FIGURE 7. For each grounded code element a circuit path is completed from constant current generator 450, line 456, line 22, closed contacts in relay matrix 14, selected address line 18, resistor and forward-biased diode in the code element (not shown), and digit line 110 to ground.

The resistance value of the code elements increases with the digit value of the code elements. The specific values of resistance are preferably chosen to correspond to the resistors 466 in the comparator. For example, the resistor in all elements numbered "one" would have the same resistance as the resistor 466*b* in level line one 124*b*; the resistor in all elements numbered "two" would have the same resistance as the resistor 466*c* in level line two 124*c*; the resistor in all elements numbered "zero" (ten) would have the same resistance as the resistor 466*k* in level line ten. The resistor in all elements numbered fifteen would have the same resistance as the resistor 466*p* in level line fifteen 124*p*. By having these resistances made equal and using a constant current source 450 in the comparator, precision reference voltage levels are established. All elements numbered 16 are given a resistance slightly greater than that of resistors 470 and 466*p* combined.

As mentioned previously, the input to the base of transistor 454 in comparator 20 is a series of voltage steps. The steps begin at zero when level line 124*a* (zero) is grounded and increase negatively as level lines 124*b* through 124*p* (one through fifteen) are grounded. Resistor 470 is a low value precision resistor which add a constant voltage drop to the drop caused by the resistor 466 is the grounded level line 124*b* through 124*p*. This constant drop insures that the reference voltage level on the base of transistor 452 is attained by the base of transistor 454 during the negative step to the next level. For example, assume that the function digit in an address has the digit value or number "two." The code element resistor numbered "two" has a resistance value equal to resistor 466*c* in level line 124*c*. In the operation of the dialer, digit counter 100 is reset and the F digit line of digit lines 110 goes to ground, placing the F digit resistor in the selected address in circuit with the constant current generator 450. A precision voltage level is now set at the base of transistor 452 and capacitor 462 is charged to this level. The comparator 20 is now set to generate an output on line 130 upon count of two being attained by level counter 120.

The level counter 120 is at zero, initially, the level line 124*a* is at ground, and the base of transistor 454 is at ground. On the count of one, level line 124*b* goes to ground and a negative voltage level, determined by the current flow through resistances 470 and 466*b*, is established on this transistor base. For the count of two, level line 124*c* goes to ground and the base of transistor 454 steps toward the new negative level, determined by current flow through resistances 470 and 466*c*. Were resistor 470 not present, this new level would equal the level established on the base of transistor 452. However, due to the fractional voltage drops of transistors 452 and 454, these two equal voltages would not forward-bias transistor 454 and the comparator 20 would not fire. By inserting resistor 470, the voltage level on the base of transistor 452 and at capacitor 462 is surpassed during the step or transition which insures that transistor 454 will be forward-biased when the desired count is attained. Resistor 470 produces a voltage which is approximately one-half the voltage increment between each level. In the present example, when the count of two is attained, transistor 454 conducts. Its collector undergoes a positive transition which is differentiated at 496, and a positive spike is applied on output line 130.

Thus, for any digit in an address, the comparator is designed to give an output when a level count corresponding to the digit value is attained by counter 120. For example, for a digit number of one, one count; for a digit number of two, two counts; and so forth through a digit number of sixteen, sixteen counts. If the maximum count of sixteen is desired the resistor in the code element, which is slightly greater than the combined resistance of resistors 470 and 466*p*, establishes a voltage level which permits the comparator to count to fifteen without firing. During the count of fifteen when level line 124 goes to ground, diode 497 becomes forward-biased and the output of inverter 498 goes negative, charging the capacitor in differentiator 499. At the count of sixteen binary counter 120 returns to zero and level line 124*p* goes negative. The output of inverter 498 goes to ground, and a positive spike is passed by differentiator 499 to comparator output line 130. One point of clarification should be made here. Normally, most telephones are designed to dial for any digit a maximum number of ten pulses or tone pairs, which maximum corresponds to the digit "zero." Because digits greater than zero (ten) are used in the dialing procedural of certain special telephone equipment, in the present invention provision is made for dialing up to sixteen pulses or tone pairs for any digit. An example of the use of the six additional tone pairs is to perform special routing and priority instructions to automatic switching equipment in both military and commercial telephone systems.

Figure 8:
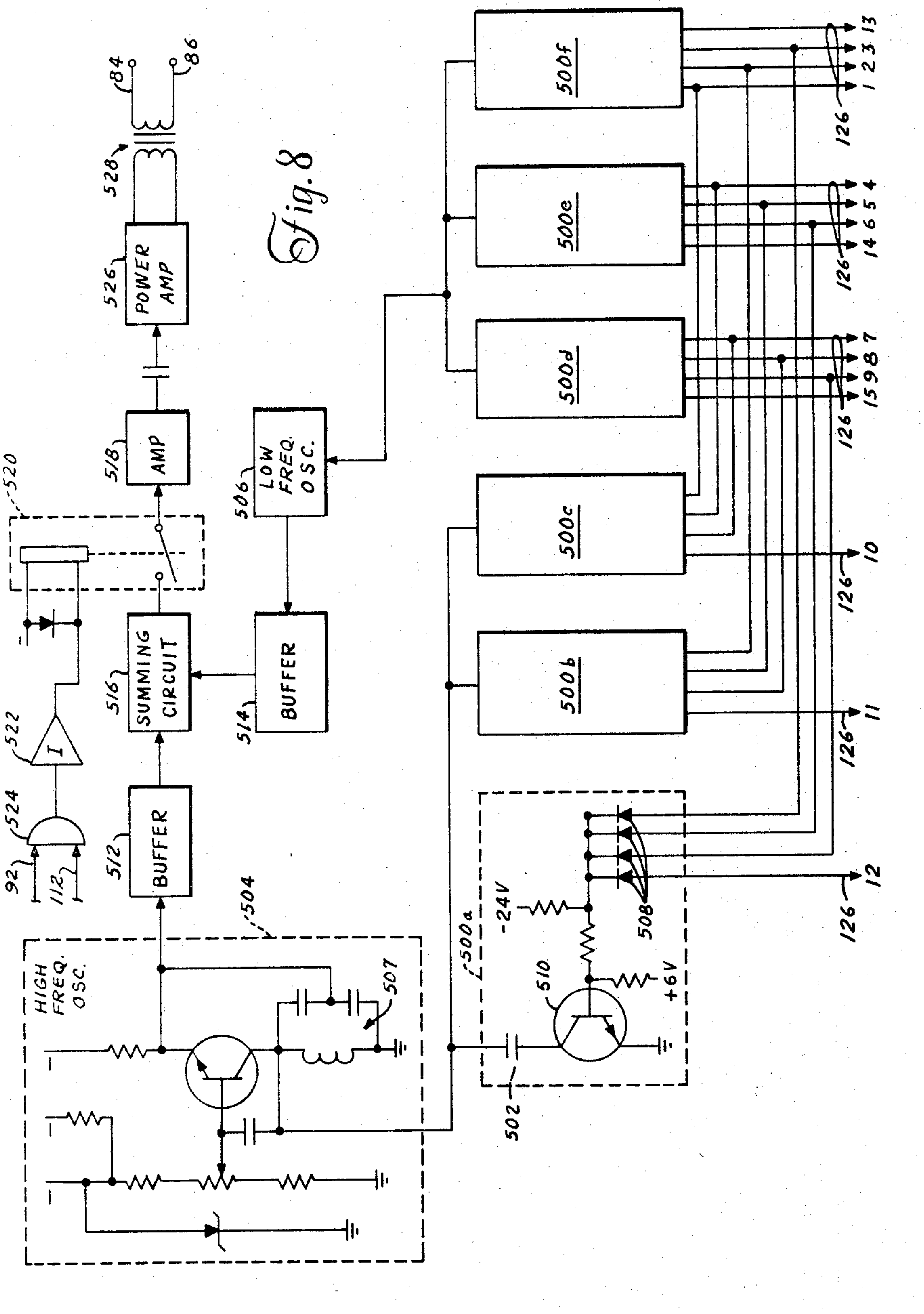

Another example of a resistive memory is to be found in FIGURE 4 of aforementioned patent application Ser. No. 370,780, now U.S. Patent No. 3,341,666, where there is shown a plurality of individual address cards, each card capable of being selected by actuation of the appropriate selector relay. FIGURE 8 shows the oscillator and frequency selecting circuits 82 for generating the Touch-Tone frequencies used in the AC dialing mode. For each digit number a distinct pair of frequencies is generated. Fifteen level lines 126 are connected to six converter stages 500*a* through 500*f*, as shown. These level lines 126 represent level lines one through fifteen, inclusive, and correspond to level lines 124*b* through 124*p*, respectively. The construction of each converter stage is identical to the schematic for stage 500*a* with the exception that the value of capacitor 502 is changed. Oscillators 504 and 506 are conventional Colpitts transistorized oscillators having a tuned collector circuit 507, as shown in the schematic for oscillator 504. Oscillator 504 free runs at a frequency of 1633 cycles and oscillator 506 free runs at a frequency of 941 cycles. The output frequency of oscillator 504 can be changed by the capacitance selected from stage 500*a*, 500*b*, or 500*c*, and the frequency of oscillator 506 can be changed by the selection of capacitance from stage 500*d*, 500*e*, or 500*f*. The capacitance 502 in the selected stage 500 is coupled in parallel with the tuned circuit of the oscillator to shift the output frequency of that oscillator.

Oscillator 504 and stages 500*a* through 500*c* establish the high frequency signal of a tone pair, while oscillator 506 and circuits 500*d* through 500*f* establish the low frequency signal of a tone pair. In each stage 500 four level line inputs are connected to four separate diodes 508 comprising an OR gate. The output of this OR gate is connected to a normally nonconducting transistor inverter 510. When transistor 510 is caused to conduct by the conduction of a diode 508 in the OR gate, its collector goes to ground, grounding one side of capacitor 502 and thereby placing that capacitor across the tuned collector circuit of the Colpitts oscillator.

The level lines 126 connected to stages 500*a* through 500*c* are chosen such that only one of these stages is conducting at one time or else all are nonconducting. Thus, additional capacitance is added to oscillator 504 from only one of these stages at any time, or else no additional capacitance is added and oscilltor 504 runs at its normal frequency. This same relationship holds in regard to oscillator 506 in that the level lines 126 are selected so that only one of these stages 500*d* through 500*f* is conducting at any one time or else all three are nonconducting.

When level counter 120 is reset to the zero condition all level lines 126 are at negative potential, back-biasing all diodes 508 in the stages 500*a* through 500*f*. In this condition, oscillators 504 and 506 will oscillate at their natural frequency. When the level count advances to one, level line one goes to ground and the remaining level lines stay at negative battery. Circuit 500*c* and 500*f* conduct and the capacitance of their capacitors 502 add to the capacitance of the tuned circuit of oscillators 504 and 506, respectively, to give an output frequency of 1209 cycles at oscillator 504 and a frequency of 697 cycles at oscillator 506. For a count of two, level line two is the only level line at ground potential and circuits 500*b* and 500*f* conduct to give an output of 1336 cycles out of oscillator 504 and an output of 697 cycles out of oscillator 506. Thus, for each level count, two distinct frequencies are generated by oscillators 504 and 506 to form the tone pair for that level count. The following table shows the tone pairs which will be generated for each distinct count of level counter 120.

| Level count | Oscillator 506 frequency | Oscillator 504 frequency |
|---|---|---|
| 1 | 697 | 1,209 |
| 2 | 697 | 1,336 |
| 3 | 697 | 1,477 |
| 4 | 770 | 1,209 |
| 5 | 770 | 1,336 |
| 6 | 770 | 1,477 |
| 7 | 852 | 1,209 |
| 8 | 852 | 1,336 |
| 9 | 852 | 1,477 |
| 10 | 941 | 1,209 |
| 11 | 941 | 1,336 |
| 12 | 941 | 1,477 |
| 13 | 697 | 1,633 |
| 14 | 770 | 1,633 |
| 15 | 852 | 1,633 |
| 16 | 941 | 1,633 |

For the level count of sixteen, the counter 120 returns to zero and the zero level line from converter 122 goes to ground. All of the level lines 126 leading into stages 500 are at negative potential and oscillators 504 and 506 will oscillate at their natural frequency. Thus, if a digit in an address has a value of sixteen, the output of the oscillators, as shown by the above table, will be their natural frequencies.

The output of oscillators 504 and 506 are connected respectively to buffer amplifiers 512 and 514. These two amplifiers can be adjusted to provide equal amplitude outputs which are then added linearly in summing circuit 516 to give a pair of output tones with no intermodulation. This signal is applied to amplifier 518 through the contact of relay 520.

The output of amplifier 518 is connected to power amplifier 526 whose output is, in turn, connected to the primary of transformer 528. The secondary of this transformer is connected by lines 84, 85 to the primary of transformer 210 in each selector 10. Relay 520 is controlled by inverter 522 which is, in turn, controlled by AND gate 524. The input of AND gate 524 is connected by line 92 to the output of AC logic 58 and by the F digit line 112 to converter 80.

*Operation*

Prior to the operation of the repertory dialer, the mode selector 68 is strapped to provide the desired dialing mode sequences. Sample strapping is shown in FIGURE 6 and has been discussed previously. The addresses are then programmed using memory units such as described in the afore-mentioned patent applications Ser. No. 455,724 or Ser. No. 370,780 now U.S. Patent No. 3,341,666. The first programmed digit of every address is the function digit and the number used for that digit corresponds to the desired dialing mode sequence strapped in mode selector 68. For example, if the number 703–354–3400 is to be programmed into address twelve of the repertory 16 and the dialing mode sequence is to be that strapped in matrix three of FIGURE 6, then the address twelve would be programmed as 3–703–354–3400. The first digit "3" is the function of F digit and the remaining digits are the dialing digits. Thus, selecting address twelve causes the telephone number to be dialed out in the mode sequence set by matrix three.

If the repertory dialer is located in a PBX where a digit such as the digit nine must be first dialed to seize an "outside" line, the same address twelve in repertory 16 can be programmed as 1–9–703–354–3400. Here the function digit has the value one and the dialing mode sequence would be as strapped in matrix one as shown in FIGURE 6. In this sequence, the digit "9" is first dialed DC and a wait period follows to provide time for outside line seizure. "703" is then dialed AC and the remaining digits, DC. As a further example, matrix four can be strapped for all DC dialing and the above number is then programmed as 4–703–354–3400 if all DC dialing is desired. Matrix five can be strapped for all AC dialing and the above number programmed as 5–703–354–3400 if all AC dialing is desired. The significant feature is that the mode selector 68 is prestrapped to give the desired variety of dialing mode sequences, and then the addresses are programmed with the value of the function digit of each address chosen to correspond to the desired dialing mode sequence.

In order to describe all modes of operation, assume that the repertory dialer and telephones 12 are connected in a PBX and that address twelve in the repertory 16 is programmed as 1–9–703–354–3400. The digit "one" is programmed as the value of the function digit because the desired dialing mode sequence is as strapped in matrix one shown in FIGURE 6. In the operation of this automatic repertory dialing system a simple general procedure is followed. In the usual manner the subscriber lifts the hand set of his telephone 12 and listens for the dial tone to indicate that his telephone is connected to the line. Here, receipt of the dial tone would indicate that his telephone is connected to the PBX switchboard. The subscriber then observes the busy lamp 182 on his selector 10 to see if the repertory dialing equipment is in use. If this lamp is unlit the subscriber is free to proceed and momentarily depresses the desired selector button 150 on his selector mechanism.

Assuming that selector I and telephone I are being used, the subscriber, for example, depresses push button S12 and the automatic dialing begins. Current flows to relay winding 218*b* and 220*a* in relay bank 14 causing their contacts to switch positions. Address 12 in repertory 16 is connected through its line 18, contact 12 in the relay bank, column 222*b* and line 22 to the comparator 20. Relay 216 is also energized and it grounds the input line 26 leading to master logic 24. In selector I only current also flows on line 170 to line 174, energizing relay 175 and illuminating dialing lamp 178. The contacts of relay 175 switch position. Line 190 now rises to the supply potential via contact 3 of relay 175.

The grounding of line 26 causes differentiator 250 in FIGURE 3 to pass a positive spike to the set input of the eight ms. one-shot 252, causing it to change conducting states. When one-shot 252 changes states, its one output goes negtaive. Inverter 254 conducts and its output goes to ground causing differentiator 256 to emit a larger positive spike on line 52 which resets the digit counter 100 to the zero level, the function counter 66 to the zero level, the mode driver 70, and also ensures that the level counter 120 is reset to the zero level.

The negative output of the one side of one-shot 252 is also applied through OR gate 258 to inverter 274. Line 30 at the output of inverter 274 goes to ground. Winding 224 in the power supply relay 28 becomes energized, switching its contacts and removing the negative supply from idle line 32 to busy line 34 and also applying negative potential to mode relays 40. Current flows to the energized relays in relay matrix 14 through their second contact to hold them energized. Current flows through contact 1 of relay 175 in selector I to hold this relay energized and lamp 178 illuminated and to maintain lines 174 and 190 at negative potential. Selector I is now conditioned to pass the subsequent dialing signals.

Current also flows through line 34 to the other selectors 10 by way of contact 1 of their relays 176 and through busy lamps 182. These lamps become illuminated which informs the subscribers at the other selector stations that the repertory dialer is now in use. It should be noted here that with the transfer of negative supply from line 32, the pushbuttons 150 in all selector 10 are made ineffective. Thus, depressing any of these buttons has no effect on the dialer. Furthermore, certain of the unidirectional diodes 158, 162, 166 and 172 in the selectors 10 are reversed biased to prevent inadvertent supply of negative potential to the selectors by any of the lines connected to line 34.

After 8 ms. have passed, one-shot 252 times out and its one output rises to ground. Differentiator 260 passes a positive spike to the set input of flip-flop 262. Flip-flop 262 changes state and its zero output rises to ground potential. Inverter 264 inverts this ground condition to a negative signal which is applied to the second input of the OR gate 258 and to one input of each of the AND gates 270 and 272. The time between the removal of negative potential from one input of OR gate 258 and applying it to the second input is only of the order of a microsecond and is insufficient to let relay 28 become de-energized. AND gates 270 and 272 remain closed. Line 266 remains at negative potential throughout the dialing sequence. A ground condition appears on line 56 leading to the function select logic 54.

Any time after flip-flop 262 is set the dialer can be manually reset by depressing the reset button 184 in the actuated selector 10. Here, depression of button 184 in selector I will cause ground to appear on line 188 through contact 2 of relay 176 permitting the winding of relay 267 shown in FIGURE 3 to become energized. The contact of this relay closes grounding the one output of flip-flop 262 thereby causing this flip-flop to clear and terminating the dialing sequence.

In FIGURE 4 the ground condition on line 56 causes differentiator 300 to emit a positive spike and trigger one-shot 302 to begin the function select cycle. One-shot 302 switches to its 40 ms. semistable state and its zero output rises to ground potential. Gated differentiator 318 has at its inhibit input a ground condition because digit counter 100 has been reset and the F digit line 112 is at ground. Differentiator 318, therefore, passes a positive spike to trigger flip-flop 316. The zero output of flip-flop 316 rises to ground removing the inhibit signal from differentiator 326 and unclamping unijunction oscillator 322.

As described previously, unijunction oscillator 322 emits a positive spike to the toggle input of flip-flop 324 every millisecond. At the end of the first millisecond flip-flop 324 is toggled to the clear position and the one output of flip-flop 324 goes to ground. Differentiator 326 passes a positive spike on line 116 to level counter 120. The positive output of flip-flop 324 is simultaneously applied by line 60 to gated differentiator 62. During the function select cycle the inhibit input of this differentiator is at ground potential via F digit line 112. Accordingly, differentiator 62 passes a positive spike to function counter 66. During this function select cycle, level counter 120 and function counter 66 count in unison. Because both counters have been previously reset the first positive spike to each counter 66 and 120 causes the counter to attain the counter 1.

In selected address 12 the F digit has a numerical value of 1 and the coded resistor in repertory 16 established a predetermined voltage level at the base of transistor 452 of comparator 20 (FIGURE 7). Capacitor 462 is charged to this voltage. With level counter 120 reset, level line 124*a* is at ground potential causing the base of transistor 454 to be also a ground potential. When level counter 120 advances to the count of one, level line 1 goes to ground and the base of transistor 454 steps down to its first negative level determined by the current flow through resistor 470 and resistor 466*b*. At this time transistor 454 becomes forward-biased and conducts. Its collector rises to ground potential causing differentiator 496 to emit a positive spike out on line 130. In FIGURE 4 this positive spike from comparator 20 clears flip-flop 316. Its zero output drops to negative potential reclamping unijunction oscillator 322 and returning flip-flop 324 to the set position.

Function counter 66 attained the count of one with level counter 120. The output of the first AND gate in converter 380 of mode selector 68 (FIGURE 6) goes negative. The output of the first inverter 382 goes to ground removing the inhibit inputs from the gated differentiating circuits in the first matrix 384. Because unijunction oscillator 322 has been reclamped, no further drive pulses will be applied to counter 66. Accordingly, matrix one determines by the strapping between the digit line 114 and the output line 69 the dialing mode sequence for the dialing digits of address 12. The function select cycle is now complete.

Because only the count of one had to be attained for the function digit of the selected address twelve the entire function select cycle consumed only slightly more than one millisecond. Slightly less than 39 ms. later the one-shot 302 times out and its one output rises to ground, triggering by line 92 the 500 microsecond one shot multivibrator 90.

When delay circuit 90 changes state at the end of the function select cycle, its zero output rises to ground potential and advances digit counter 100 to the count of one and resets level counter 120 to the zero count. When digit counter 100 advances to the count of one, as regards the digit lines 110, the converter 80 causes the F digit line to go negative and digit line one to go to ground. The remaining digit lines stay at negative potential. In repertory 16 ground is shifted to the second coded digit (not shown) in address number 12. The second digit in address 12 has a numerical value of 9 and the coded digit resistor in the coded address has a resistance value equal to the resistor 466*j* in comparator 20. This digit resistor establishes a reference voltage on the base of transistor 452 in comparator 20 which will permit level counter 120 to attain 9 counts before the comparator is actuated.

In mode selector 68 shown in FIGURE 6, digit line one (114*a*) is strapped to the input of differentiator 386 in matrix one. The output of this differentiator is strapped to DC bus 69*a*. When converter 80 places digit line 114*a* at ground, differentiator 386 passes a positive spike to DC bus 69$a$ and from there to differentiating circuit 410 in the mode driver 70. The output of differentiator 410 is a positive spike which sets DC flip-flop 412. The zero output of flip-flop 412 goes to ground and by way of line 76 removes the inhibit input from gated differentiator circuits 350 and 354 in the DC logic 80 (FIGURE 5). The one output of flip-flop 412 goes negative and this negative potential is applied to AND gate 272 shown in FIGURE 3 via line 48. Because line 50 coming from Wait logic 78 is also at negative potential, coincidence occurs at AND gate 272 and it opens. Line 38 rises to ground. This ground condition on line 38 permits winding 228 in the mode relays 40 (FIGURE 2$b$) to become energized, and its associated contact switches ground to line 44. Line 44 leads to all selectors 10. In selector 1 only line 190 is at negative potential. With ground on line 44, current now flows through relay winding 192 causing both contacts of relay 193 to switch. Contact 1 of this relay applies a shunt connection across the telephone line so that the subsequent dialing clicks will not be heard by the subscriber. Contact 2 of this relay applies negative potential to line 206. The repertory dialer is now prepared to dial out the first dialing digit on a DC basis.

When 500 microseconds have elapsed, delay circuit 90 switches back to its stable state and its one output goes to ground. Because line 104 coming from Wait logic 78 is at ground, there is no inhibit input at gated differentiator 98. When this ground condition from delay circuit 90 is applied to differentiator 98 by line 96 the positive spike known as a strobe spike is transmitted to AC logic 58 and DC logic 80. In AC logic 58 shown in FIGURE 4, line 72 is at negative potential and differentiator 308 is inhibited. In DC logic 80 differentiator 350 receives this strobe spike and passes a positive spike to the set input of the 600 ms. one-shot multivibrator 352.

After 600 ms. one-shot 352 times out and a positive spike is sent by differentiator 358 to set flip-flop 356. The zero output of flip-flop 356 goes to ground removing the clamp from unijunction oscillator 364. Flip-flop 368 is in the clear state. Because of the 40/60 make-break ratio established by the oscillator 364 and the flip-flop 368, 40 ms. later unijunction 364 toggles 368 to the set state. Initially, the one output of flip-flop 368 is at ground, signifying a make condition, and the line 88 is at negative potential. When the break condition occurs 40 ms. after the clamp is removed, the one output goes negative and line 88 goes to ground. With line 88 at ground relay 203, in selector I only, is energized causing its contact to open and which by its connection with the pulse contact of the dial circuit of telephone I causes the telephone line to be interrupted. Relay 203 stays energized for 60 ms. at which time unijunction oscillator 364 toggles flip-flop 368 to the clear position. The one output of this flip-flop goes to ground and line 88 goes negative de-energizing the relay 202. Its contact returns to normal and the telephone line is again uninterrupted. When the one output of flip-flop 368 goes to ground, a positive spike is sent to level counter 120 on lines 118, 119 indicating that one pulse has been dialed. Level counter 120 advances in response to this spike. Converter 122 causes level line 124$a$ to again go negative and level line 124$b$ to go to ground. The base of transistor 454 in comparator 20 steps to its first negative level.

After 40 ms. unijunction oscillator 364 again toggles flip-flop 368 to the set position causing the one output to go negative. Line 88 goes to ground and selector I again interrupts the telephone line by actuation of relay 203. Sixty ms. later flip-flop 368 is cleared and its one output goes to ground. Relay 202 in selector I becomes de-energized, closing the telephone line. Simultaneously a positive spike is sent to level counter 120 advancing this counter to count two. Converter 122 causes level line 124$b$ to drop to negative battery and line 124$c$ to go to ground. The comparator 20 steps to its second negative level.

The aforedescribed procedure continues until the telephone line associated with selector I has been interrupted nine times. When the flip-flop 368 is toggled to the clear state and output one goes to ground signifying the end of the ninth break period, the ninth input spike is applied to level counter 120 by lines 118, 119. This level counter attains its ninth count and converter 122 causes level line 124$j$ to go to ground. Transistor 454 in comparator 20 steps towards the ninth negative level. The voltage of this ninth level exceeds the voltage established by the second digit resistor in address number twelve. Transistor 454 conducts and a positive spike is transmitted on line 130 to clear flip-flop 356 in DC logic 80. The zero output of this last-named flip-flop goes negative restoring the clamp on oscillator 364 and flip-flop 368. At the same time differentiator 362 emits a positive spike on line 94 to set the 500 microsecond one-shot 90. The zero output of this one-shot goes to ground advancing by line 97 the digit counter 100 and resetting the level counter 120. Converter 80 causes the second digit line 110 following the F digit line to go to ground. The third digit (second dialing digit) in the address 12 has a numerical value of seven and the code element in this address has the same resistance as resistor 466$h$ in comparator 20 to establish the required voltage level.

In mode selector 68 (FIGURE 6) digit line 114$b$ now goes to ground. A positive spike is simultaneously applied by differentiator 388 onto AC bus 69$b$, and by differentiator 390 onto Wait bus 69$c$. In mode driver 70 the positive spike on line 69$b$ causes differentiator 414 to set the AC flip-flop 416. The positive spike on Wait bus 69$c$ causes differentiator 418 to set the Wait flip-flop 420. The zero output of flip-flop 416 goes to ground causing differentiator 428 to clear the DC flip-flop 412. Line 76 again becomes negative while line 48 leading to AND gate 272 in the master logic 24 goes to ground, closing this gate.

Line 72, connected to the zero output of flip-flop 412, applied ground to the inhibit input of differentiating circuits 308 and 310 in the AC logic 58 shown in FIGURE 4. Line 46 connected to the one output of flip-flop 416 goes negative and applies a negative input to AND gate 270 in master logic 24. The zero output of Wait flip-flop 420 in mode driver 70 goes to ground which potential is applied by line 74 to the Wait logic 78 shown in FIGURE 4. The ground condition on line 74 causes the differentiator 332 to emit a positive spike setting variable one-shot 328. The zero output of one-shot 328 goes to ground and by way of line 50 applies this ground potential to AND gates 270 and 272 in master logic 24. These two gates are held open regardless of the condition of the other inputs. The ground condition at the zero output of one-shot 328 causes AND gate 331 to open. A ground input is applied to inverter 332 and a negative signal appears on line 104 inhibiting gated differentiator circuit 98 (FIGURE 1). When the 500 microsecond one-shot 90 times out, its one output again goes to ground. Differentiator 98 cannot pass a strobe spike to AC logic 58 and DC logic 80 because of the inhibit input being applied by Wait logic 78. Accordingly, before the next digit can be dialed out the Wait period must elapse.

In the present case it is to be assumed that a three-second Wait period is normally sufficient to permit the PBX to seize an output line. Accordingly, one-shot 328 is adjusted to remain in its semistable state for three seconds. At the end of the three-second period one-shot 328 returns to its stable state and its zero output goes negative. Coincidence occurs at gate 331 and a negative input is fed to inverter 332. Line 104 goes to ground removing the inhibit input from differentiator 98. Line 50 reapplies the negative output level to the AND gates 270 and 272 in the master logic 24. Because line 46 is also at negative potential coincidence is present and the AND gate 270 opens. Line 36 goes to ground. With line 36 at ground, winding 226 in the mode relays 40 (FIGURE 2$a$) becomes energized grounding line 42. Relay 197, in selector I only, becomes energized switching its contact and thereby placing the secondary of transformer 210 in the telephone line. Line 214 shorts out the telephone. Selector I is now conditioned to transmit AC dialing signals.

When the variable one-shot 328 returns to its stable state after the Wait period, its one output and line 106 rises to ground potential causing differentiator 310 in the AC logic to transmit a positive spike to the set input of one-shot 304. Line 106 from the Wait logic 78 is also connected to differentiator 354 in DC logic 80. Because mode driver 70 is set to the AC mode, the negative potential on line 76 inhibits differentiator 354. It should be noted that had the DC dialing mode been strapped for this second dialing digit the strobe output from Wait logic 78 at the end of the Wait period would have bypassed the 600 ms. one-shot 352 of the DC logic 80. This 600 ms. period is to provide the proper interdigit delay time between consecutive digits dialed on a DC basis. Because the variable one-shot 328 in the Wait logic 78 would be generally set for a period greater than 600 ms. it becomes unnecessary to incorporate a 600 ms. delay when a DC dialing digit is to follow a Wait period.

Line 106 from Wait logic 78 is also applied back to mode driver 70 so that flip-flop 420 is cleared when the Wait period ends. In this manner, there will be no Wait period preceding subsequently dialed digits unless, of course, the Wait mode is strapped in the mode selector 68.

During the AC dialing cycle two 40 ms. one-shot 302 and 304 are employed in contrast to the function select cycle where only one-shot 302 is used because an additional 40 ms. period is needed for the transmission of the AC dialing signals by the oscillator. After the aforedescribed Wait period differentiator 310 emits a positive spike to the set input of one-shot 304. The zero output of this one-shot rises to ground and differentiator 314 emits a positive spike to set flip-flop 316. The zero output of flip-flop 316 rises to ground removing the clamp from unijunction oscillator 322 and the flip-flop 324. The combination of these last two circuits functions exactly as described in the function select cycle where the unijunction oscillator toggles the flip-flop 324 after one ms. and every millisecond thereafter until flip-flop 316 is cleared. Differentiator 326 emits a positive spike at the end of the first millisecond and every two milliseconds thereafter. Accordingly, level counter 120 begins its count and drives the converter circuit 122. Note here that function counter 66 is not affected because of the inhibit input applied to gated differentiator 62 by the F digit line 112 which is now at negative potential.

As level counter 120 advances in response to each input spike from AC logic 58, inverter 22 progressively grounds the level lines 124. When level counter 120 attains the count of seven, ground is applied to level line 124*h* (FIGURE 7). The base of transistor 454 in comparator 20 steps to its seventh negative level surpassing the preset voltage established by the repertory 16. Comparator 20 fires and clears flip-flop 316 in AC logic 58 and as a result, the clamp is reapplied to oscillator 322 and flip-flop 324.

To generate and count these seven pulses has taken slightly over 13 ms. Approximately 27 ms. later one-shot 304 times out and sets one-shot 302. The zero output of this one-shot goes to ground; however, differentiator 318 now has an inhibit input being applied on line 112 and no triggering spike is sent to flip-flop 316. The one output goes negative and a negative potential condition exists on line 92 for these forty ms. In the oscillator and tone select circuit 82 shown in FIGURE 8, this negative potential on line 92 together with the negative potential now present on F digit line 112 causes AND gate 524 to open and apply a negative input signal to inverter 522. The output of inverter 522 goes to ground and relay 520 becomes energized. Its contact closes completing the path between circuit 516 and amplifier 518.

Of the fifteen input level lines 126 which are applied to the converter stages 500, level line seven applied to stages 500*c* and 500*d* is at ground. The OR gate in each of these stages opens causing its transistor 510 (not shown) to conduct. The oscillator 504 now includes the capacitance of stage 500*c* in its tuned collector circuit and the oscillator 506 includes the capacitance of stage 500*d* in its collector circuit. Referring to the table, it is seen that for a level count of seven, oscillator 504 generates a 1209 cycle tone while oscillator 506 generates a 852 cycle tone. After passing through buffer stages 512 and 514 respectively, these two frequencies are summed in circuit 516 and emerge as a tone pair of 852 and 1209 cycles representing the dialing digit having the numerical value of 7. This tone pair is amplified in amplifying stages 518 and 526 and then applied to output transformer 528. The secondary of this transformer applies this tone pair by lines 84 and 85 to the primary of transformer 210 in the selectors. In selector I only, the secondary of transformer 210 applies this tone pair to the telephone line for the 40 ms. period. The digit 7 is dialed out on an AC basis.

At the conclusion of the 40 ms. period one-shot multivibrator 302 returns to its stable state and line 92 goes to ground. Relay 520 in the oscillator circuit 82 becomes deenergized, opening its contact. At the same time the 500 ms. delay circuit 90 is triggered to its semistable state. Its zero output rises to ground potential advancing digit counter 100 to the count of three and resetting level counter 120 to zero. Converter 80 now places the fourth digit line 110 at ground and thereby connects to comparator 20 the resistance of the fourth coded element of address 12. The fourth digit of address 12 is the third dialing digit and it has a numerical value of zero (10). The voltage established on the comparator will permit level counter 120 to reach a count of ten in the dialing of this fourth digit. In mode selector 68 digit line 114*c* is not strapped to matrix 1. Therefore, the fourth digit of the address 12 will be dialed out in the same mode as the previous digit, i.e., AC.

At the end of the 500 microsecond period delay circuit 90 returns to its stable state and its one output goes to ground. Differentiator 98 transmits a positive spike to AC logic 58 on line 102 within the AC logic 58 (FIGURE 4). The positive spike is received by differentiator 308 which sets one-shot 304. From this point on, the generation and transmittal of the digit zero on an AC basis is the same as for the previous digit seven, culminating in the transmission of a 40 ms. tone pair of 941 and 1209 cycles by selector I onto the telephone line. At the conclusion of the dialing of the fourth digit in the address line 92 in the AC logic rises to ground triggering the 500 microsecond delay circuit 90 and resetting level counter 120 and advancing digit counter 100. The dialing of the fifth digit in the address, which has a numerical value of three, follows the same procedure as the previous digit. The fifth digit is also dialed on an AC basis and for 40 ms. the tone pair having the frequencies of 697 cycles and 1477 cycles is transmitted by selector I onto the telephone line. After dialing this fifth digit, line 92 rises to ground again triggering the 500 microsecond one-shot 90. Digit counter 100 is advanced to the fifth count and level counter 120 is again reset.

The sixth digit line 110 goes to ground placing the resistance in the sixth coded element of the address 12 in circuit with the base of transistor 452 in comparator 20. In mode selector 68 shown in FIGURE 6 digit line 114*e*, corresponding to the fifth dialing digit, is strapped to the input of differentiator 392 in matrix 1. The output of this differentiator is connected to the DC bus 69*a*. When converter 80 puts line 114*e* at ground, a positive spike is sent out on the DC bus 69*a* to set flip-flop 412 in mode driver 70. The zero output of this flip-flop goes to ground and clears AC flip-flop 416 via diode 422 and differentiator 424. Line 76 is connected to this zero output and by being at ground potential, the inhibit input is removed from differentiator 354 in DC logic 80. The one output of flip-flop 416 is now at negative potential and this negative potential is applied by line 48 to AND gate 272 in the master logic 24. Because all inputs to AND gate 272 are now at negative coincidence this gate turns on. Output line 38 goes to ground causing winding 228 in the mode relays 40 to become energized. The contact connected to this winding switches position and applies ground to line 44. Relay 193 in selector I only now becomes energized. Via contact 1 and lines 200, a shunt is applied across the telephone line. Through contact 2, line 206 rises to negative potential.

In master logic 24 and gate 270 is now closed because of the absence of negative potential on line 46. Line 36 goes negative and winding 226 in the mode relays 40 de-energizes. Relay 197 in selector I also de-energizes. Selector I is now conditioned to dial out DC pulses. An inspection of matrix 1 and mode selector 68 in FIGURE 6 shows that no lines 114 following the digit line 114*e* are strapped to this matrix. Accordingly, all the remaining digits in the address 12 are dialed out on a DC basis.

At the conclusion of the 500 microsecond dialing period the one output of delay circuit 90 rises to ground and a positive strobe spike is applied on line 102. Only the DC logic 80 is now conditioned to receive this strobe and differentiator 350 responds by triggering the 600 ms. one shot 352 to its semistable state. At the end of this 600 ms. period, one-shot 352 times out and differentiator 358 transmits a positive spike to set flip-flop 356. The remainder of this dialing sequence is as previously described in connection with the DC dialing of the second digit in address 12. This sixth digit has a numerical value of three and ultimately the telephone line is interrupted by selector I three times to dial the three DC pulses. Thereafter a positive pulse again sets the 500 ms. delay circuit 90. As has been previously described, the level counter 120 is once again reset and the digit counter 100 is advanced to its next count, here being the count of six. The converter 80 places the seventh digit line 110 at ground and conditions comparator 20 for the ensuing dialing sequence by the resistor in the seventh coded element. The seventh digit is the sixth dialing digit and has a numerical value of five. During the pulse generation the telephone line will be interrupted five times by selector I to simulate the dialing of five DC pulses. For the remaining five digits in address 12, which are all dialed in the DC mode, the dialing sequence is the same. For the eighth digit there are four pulses dialed; for the ninth digit, 3 pulses; for the tenth digit, 4 pulses; and for the eleventh and twelfth digits, 10 pulses each.

At the conclusion of the dialing of the twelfth digit which is the last digit in the particular address 12, delay circuit 90 is again triggered. The zero output of this circuit rises to ground potential advancing digit counter 100 to the next count and resetting level counter 120. Converter 80 shifts ground to the next digit line 110 and thereby applies ground to the thirteenth digit position in address 12. However, since there are only twelve coded elements programmed into this selected address, there is no resistance path provided for the constant current flowing to the base of transistor 452 in comparator 20. The base of this transistor is now capable of rising to the full potential of the constant current generator 450.

When the 500 microsecond delay circuit 90 times out, the output of inverter 486 in FIGURE 7 goes negative, back-biasing diodes 488 and 490. The base of transistor 452 begins to rise to the full battery potential of generator 450. The emitter of this transistor follows the voltage rise on the base. The Zener voltage of Zener diode 470 is slightly greater than the largest voltage which can be developed on the base of transistor 452 by a resistor in repertory 16. The base and, accordingly, the emitter of transistor 452 quickly attain this Zener voltage causing Zener diode 470 to conduct. A negative pulse is applied on line 132 to the set input of master flip-flop 262 (FIGURE 3) to clear this flip-flop. The one output rises to ground and the zero output goes negative. The output of inverter 264 now goes to ground removing the negative voltage from one input of each of gates 258, 270 and 272 and all three gates are closed. Both line 36 and line 38 are now at negative potential. The mode relays 40 become de-energized. No current can flow through either line 42 or 44 to operate the AC or DC dialing relays in selector I. All contacts for these relays will now be in their normal position.

Line 30 controlled by OR gate 258 goes negative causing the power supply relay 28 to become de-energized. Negative supply is removed from the busy line 34 and reapplied to idle line 32. Absent current flow on line 34, there is no holding current for the energized relays in relay matrix 14 and they return to their de-energized condition and their contacts returned to their normal position. Accordingly, address 12 is disconnected from comparator 20. Within the selector I relay 175 becomes de-energized and its contacts return to their normal position. The subscriber at telephone I now waits for call completion. At the other selectors 10 the removal of current from line 34 causes busy lamps 182 to become extinguished indicating to the other subscribers that the repertory dialer is now available for immediate use. Another subscriber having access, for example, to selector II associated with telephone II, lifts his handset, obtains his dial tone, and observing that his busy lamp 182 is unlit, depresses the button 150 on his selector corresponding to the address which he desires to call.

Within the dialer itself it takes less than a millisecond for the various components to become quiescent but, obviously, this very short period of time would not interfere with subsequent operation of the dialer by another subscriber. For example, when the 500 microsecond delay circuit timed out after the twelfth digit, a positive spike was passed to AC logic 58 and DC logic 80. One of these two circuits is normally conditioned to receive this pulse and in this particular case it is the DC logic 80 because the DC flip-flop 412 in the mode driver 70 is still in the set position. A positive spike is, therefore, passed to the set input of one-shot 352. However, when flip-flop 262 in the master logic of FIGURE 3 is cleared, line 266 rises to ground potential. As mentioned previously, this line 266 is connected (not shown) to the clear inputs of the one-shots in the AC logic, DC logic, Wait logic, and the control flip-flops 316 and 356. This clear input is first differentiated and the polarity and duration of the positive spike is sufficient to overcome the simultaneous arrival of the positive spike at the set input of one-shot 352. Had the AC logic instead been conditioned by mode driver 70 the positive spike applied to the clear input of one-shot 304 would also overcome the positive spike being applied to the set input. Thus, regardless of whether the mode driver 70 has conditioned the AC logic or DC logic, the strobe spike out of the 500 microsecond delay circuit 90 is effectively blocked to prevent recycling after the last digit of an address has been dialed.

With line 266 now at positive potential, AND gate 480 in comparator 20 (FIGURE 7) closes. The output of inverter 486 goes to ground forward-biasing diodes 488 and 490. The base of transistor 452 is clamped to ground. The emitter of this transistor is also clamped to ground and this ground condition turns off Zener diode 470 and permits capacitor 462 to fully discharge. Note also that because level counter 120 is reset, the converter has the first level line 124*a* at ground, thereby clamping the base of transistor 454 to ground. Accordingly, both inputs of the comparator 20 are at ground when the dialer is idle.

In the foregoing discussion of address twelve, there were twelve of the potential sixteen digit positions programmed with code elements. If all sixteen digit positions are programmed in address twelve or in any other address, then there are no vacant digit lines 110 for converter 80 to step to and cause termination of dialing. Dialing is then terminated through the use of line 115 connected to the sixteenth digit line. When the sixteenth digit line 110 goes to ground for the dialing of the last digit, here by definition being the fifteenth dialed digit, the input of inverter 282 shown in FIGURE 3 goes to ground. The output of this inverter goes negative, charging the capacitor in differentiator 284. After this last digit is dialed, digit counter 100 is advanced by delay circuit 90 and returns to the count of zero. The first or F digit line out of converter 80 goes to ground. Line 115 goes negative back-biasing diode 280. The output of inverter 282 goes to ground and differentiator 284 passes a positive spike to clear flip-flop 262.

*Tone detector*

Figure 9:
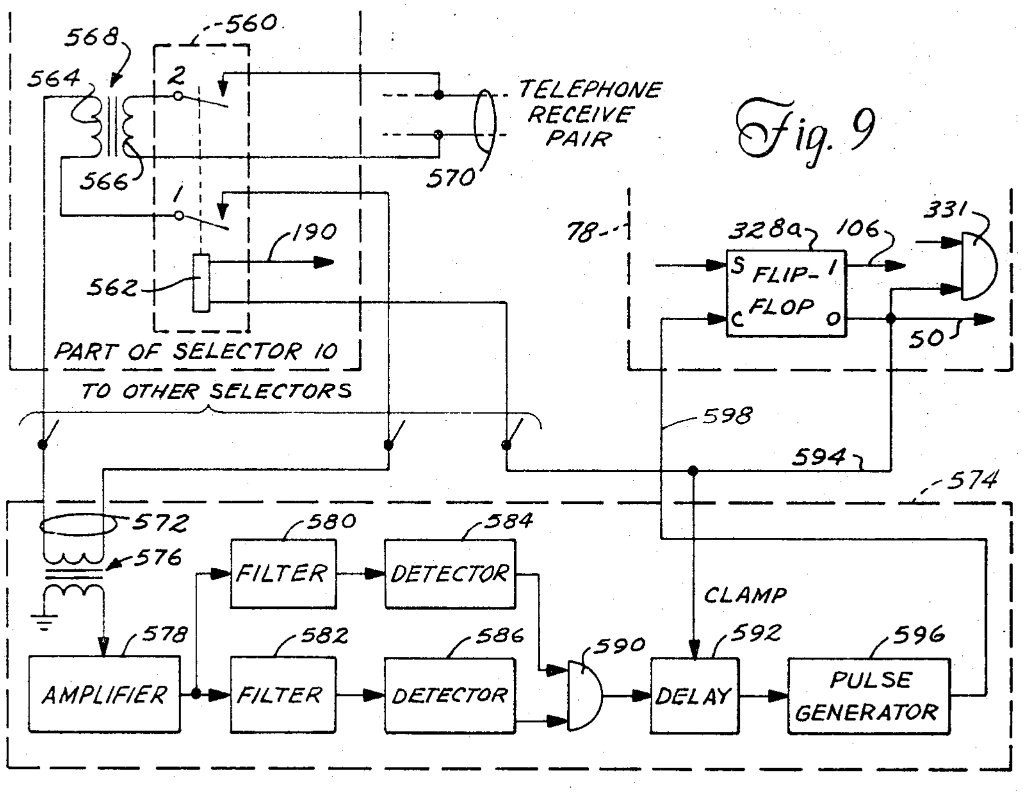
FIGURE 9 is a block diagram of a dial tone detecting circuit for use with a repertory dialer to indicate line seizure.

The addition of the circuits shown in FIGURE 9 permits the previously described Wait mode to be responsive to an external condition rather than to an elapsed time period. When the dialing sequence is in the Wait mode, a received signal, which is commonly called the dial tone and indicates line seizure, is detected to restart the dialing sequence.

In circuit 78 of FIGURE 4, the Wait one-shot 328 is replaced with a flip-flop 328*a*. All connections to the Wait circuit 78 remain the same with the exception of the additional input and output lines described below. Each selector 10 contains an additional relay 560 having one end of winding 562 connected to the existing power supply line 190. Relay 560 has contacts 1 and 2 which are in series with windings 564 and 566, respectively, of additional transformer 568. The primary 566 is connected through contact 2 in parallel with the pair of wires 570 in the telephone receiver circuit. The secondary 564 is connected through contact 1 to a pair of wires 572. These wires 572 from each selector 10 are commonly connected into a tone-detecting circuit 574.

The tone-detector circuit 574 receives signals on transformer 576 which are amplified by a conventional amplifier 578 having an automatic gain control circuit for maintaining a constant output for variations of input amplitudes. The output of amplifier 610 drives frequency selective filters 580 and 582 which are here constructed to pass the two frequencies commonly used to generate the dial tone on commercial telephone service.

The output of filters 580 and 582 drive respectively amplitude detectors 584 and 586 each of which provides a negative output when the frequency to which its associated filter is responsive is present. When both frequencies are present, coincidence occurs at AND gate 590 and its output initiates a delay 592. Line 594 is connected from the zero output of flip-flop 328*a* to relay 560 in each selector 10 and to the clamp input of delay circuit 592. When an output from gate 590 is present at the input of delay 592 for a predetermined period of time, a signal from this delay circuit is applied to pulse generator 596. The output of pulse generator 596 is connected by line 598 to the clear input of Wait flip-flop 328*a*.

When the Wait mode is actuated as previously described during the dialing sequence, flop-flop 328*a* is set by the ground signal on line 74. The zero output provides a ground path on line 594 which permits relay 562 in selector I only to energize, closing contacts 1 and 2. The clamp is also removed from the delay circuit 592. The dialer remains in this condition until a line is seized. When seizure occurs, the dial tone appears on lines 570 of telephone I. This signal is connected through the primary 566 and secondary 564 of transformer 568 to lines 572 and transformer 576. The signal is then amplified and passed to filters 580 and 582.

Each filter passes its selected frequency to its associated detector 584 or 586. The output of each detector appears simultaneously at AND gate 590 which opens to apply a negative signal to delay 592. This negative signal must appear for the period of delay before an output is available from the delay circuit 592. The requirement for simultaneous presence of both frequencies for a specified minimum period of time before pulse generator 596 can be triggered effectively discriminates against noise and other unwanted signals. The output of pulse generator 596 is a positive spike which is fed on line 598 to clear flip-flop 328*a*. The transition from the set to the clear state initiates, as did one-shot 328, a restart signal onto line 106. Line 594 goes negative, de-energizing relay 560 and reapplying the inhibiting clamp to delay circuit 592.

*AC dialer*

Figure 10:
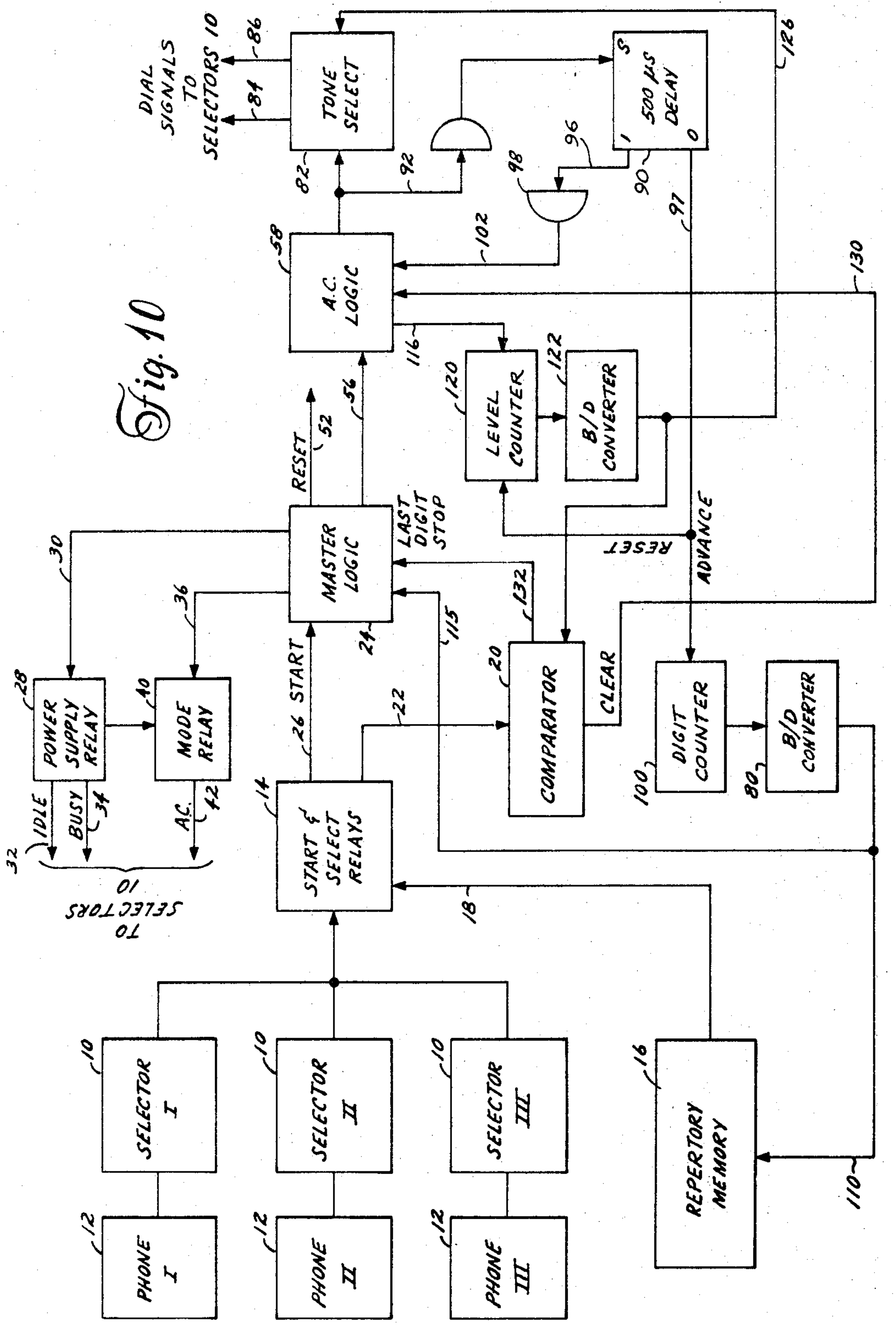
FIGURE 10 is a simplified block diagram of a preferred embodiment of a repertory call-selecting system for generating AC call-selecting signals.

In FIGURE 10 there is shown a simplified block diagram of a preferred embodiment of a repertory call-selecting apparatus for generating AC call-selecting signals. This figure is arranged to conform substantially to the arrangement of the blocks in FIGURE 1 and for convenience has followed the numbering of that figure. Because the repertory apparatus of FIGURE 10 is directed to AC call-selection only, the function select cycle is eliminated and for that reason the function select logic portion of AC logic 58 has been removed. Additionally, differentiator 62, function counter 66, mode selector 68, mode driver 70, Wait logic 78, and DC logic 81, together with their associated input and output lines have been removed from FIGURE 10.

In operation, after lifting his hand set and securing a dial tone, the subscriber depresses a push button in his selector 10. The start and selector relays 14 become energized as previously described. The selected address in repertory 16 is connected between the connector 80 and the comparator 20. Assuming here also that selector I is being utilized, relay 175 in FIGURE 2*a* becomes energized closing its contacts and placing line 190 at battery potential. The start pulse from the start relay in relay bank 14 sets one-shot 252 in master logic 24. The desired components are reset by line 52, and also line 30 is raised to ground. Relay 28 is actuated, removing the battery potential from IDLE line 32 and applying it to BUSY line 34. Line 190 in selector I only remains at battery potential. The busy lamps in the other selectors become illuminated. The energized relays in bank 14 become locked on.

After eight ms., one-shot 252 in FIGURE 3 times out, setting master flip-flop 262. Line 266 goes negative and remains there until flip-flop 262 is cleared at the termination of the dialing procedure. Line 30 stays at ground. AND gate 270 now has only one input, that being from line 266. Since this line 266 is now at negative potential, line 36 out of inverter 276 goes immediately to ground. In mode relay 40 (FIGURE 2*b*), winding 226 becomes energized, grounding line 42. In selector I, AC relay 197 becomes energized, closing its contact and applying transformer 210 in the telephone line circuit.

When digit counter 100 is reset, the first line of the sixteen output lines 110 of converter 80 goes to ground, applying the resistance in the first digit position of the selected address to comparator 20. The addresses in repertory 16 are of course not programmed with function digits for this AC dialer. Addresses which, as an example, can be used are the encoded telephone addresses shown in the previously-cited patent application Ser. No. 455,724. Assuming as before that the selected address is 703–354–3400, then this address will be dialed out completely on an AC basis. The resistance of the first programmed digit, here having a numerical value of "7," is applied to comparator 20 to establish the predetermined voltage level at the base of transistor 452 in FIGURE 7.

When master flip-flop 262 is set, the start pulse on line 56, which started the function select cycle for the multimode system of FIGURE 1, is differentiated and sets the first 40 ms. one-shot 304 in the AC logic 58 (FIGURE 4). This one-shot in turn sets flip-flop 316 which unclamps oscillator 322 and flip-flop 324. One ms. later the first of seven spikes appears on output line 116 to drive level counter 116. Upon the generation of the seventh spike, level line 124$h$ (FIGURE 7) is advanced to ground and comparator 20 fires, clearing flip-flop 316 by line 130 and terminating pulse generation.

Once the remainder of the 40 ms. period passes, one-shot 304 returns to its stable state, and its one output sets, via differentiator 312, one-shot 302. For this second 40 ms. period the line 92 is at negative potential. In FIGURE 8, AND gate 524 has only line 92 as an input because function digit line 112 is no longer necessary. The output of inverter 522 goes to ground, energizing relay 520. The output path for the generated AC tones is complete.

Of the input level lines 126 to the stages 500, line seven is at ground. Stages 500$c$ and 500$d$ conduct, placing their capacitances, respectively, in circuit with oscillators 504 and 506. A pair of AC tones of 1209 c.p.s. and 852 c.p.s. are generated by oscillators 504 and 506, respectively, and these tones are summed, amplified, and then transmitted for 40 ms. onto the telephone line I by lines 84, 86 and transformer 210 in selector I (FIGURE 2$a$).

At the end of this second 40 ms. period, one-shot 302 reverts to its stable state and line 92 goes to ground. The 500 microsecond one-shot 90 is actuated. Its zero output clears the level counter 120 and advances digit counter 100. The second digit line 110 goes to ground placing the second coded resistor, here corresponding to the digit "zero," in the selected address in the comparator 20 to establish the voltage level. At the end of the 500 microsecond period, one-shot 90 returns to the stable state and line 96 goes to ground. Because the Wait mode has been eliminated from this AC dialer, the inhibit input for differentiator 98 is not shown. A strobe spike is applied on line 102 to the set input of one-shot 304 in AC logic 58. The zero output of this one-shot is differentiated and sets flip-flop 316. Oscillator 322 and flip-flop 324 are unclamped and pulse generation begins. The remainder of the dialing procedure for this second digit is the same as described for the first digit in this address, except that ten pulses are applied to level counter 120 and the generated AC tone pair is composed of 941 and 1209 c.p.s.

The remaining digits in the address are dialed in turn following this same described procedure. The selected address has ten digits. After the tone pair for the tenth digit have been transmitted for 40 ms., one-shot 302 in AC logic 58 triggers the 500 microsecond delay circuit 90. Digit counter 100 is advanced and converter 80 grounds a line 110 for which there is no resistor programmed in the corresponding position of the selected address. When one-shot 90 times out, ground is removed from the base and emitter of transistor 452 of comparator 20 (FIGURE 7) which begin to rise to the full battery potential of the constant current generator 450. Zener diode 470 fires and applies a negative pulse to the set input of master flip-flop 262 (FIGURE 3), clearing this flip-flop.

Line 266 goes positive and, as mentioned in connection with the multimode dialer, insures that one-shots 302 and 304 and flip-flop 316 in AC logic 58 remain cleared. The output lines 30 and 36 of inverters 274 and 276 in the master logic 24 go negative. The mode relay 40 becomes de-energized, opening line 42, and relay 197 in selector I becomes de-energized. Power supply relay 28 becomes de-energized, thereby removing the negative supply from the BUSY line 34 and reapplying it to the IDLE line 32. All energized relays in bank 14 and relay 175 in selector I open. The selected address is disconnected from the comparator 20. The subscriber at telephone I now waits for call completion and the repertory dialer is available for immediate use at the other selector stations.

From the foregoing discussion of the AC call-selecting sequence it is seen that certain changes in the circuitry is preferred. For example, in the selector shown in FIGURE 2$a$, the relays 193, 203 used in DC dialing and their associated lines can be eliminated, leaving line 190 to supply only the relay 197. In FIGURE 2$b$, the DC mode relay winding 228 and its connector are eliminated. In FIGURE 3 showing the master logic 24, AND gate 272, inverter 278 and output line 38, which involve the DC dialing mode, are deleted. Lines 46, 48, and 50 are also deleted. In FIGURE 4, start line 56 and differentiator 300 are connected to the set input of one-shot 304 rather than one-shot 302 because the function select mode has been eliminated. Line 102 on which the strobe spike from the 500 microsecond delay circuit 90 is applied can be connected directly to the set input of one-shot 304. Accordingly, differentiator 308 is eliminated, as are differentiators, 310 and 318 and lines 72, 106 and 112. As mentioned previously, Wait logic 78 and FIGURES 5 and 6 are not used and are eliminated. FIGURE 7 is unchanged. Note that line 119 is the same as line 116 shown in FIGURE 10. In FIGURE 8 input line 112 to AND gate 524 is eliminated as previously explained. FIGURE 9 is not used.

The remaining circuitry is constructed the same as for the multimode dialer. Certain circuits not mentioned in the brief description of operation of FIGURE 10 function the same as in the multimode dialer. Examples of these circuits are the two clamps in comparator 20 (FIGURE 7) and the stop circuit shown in FIGURE 3 which utilizes digit line 115 for terminating dialing.

In regard to the circuits and systems which have been shown in the various FIGURES and described herein, duplication or extension of the logic can be made by well-known techniques. Furthermore, substitution of equivalent circuitry can also be performed without departing from the spirit of the invention. For example, transistor switches can be substituted for relays and comparators which are responsive to parameters other than voltage can be used. Additionally, distributors other than the counter-converter combinations used herein are available. An example of suitable equivalents would be shift registers and ring counters. Therefore, it is desired that only such limitations be placed on this invention as are imposed by the prior art and set for in the appended claims.

What is claimed is:

1. A repertory call-selecting apparatus for generating AC call-selecting signals and adapted for use with an automatic call-selecting telephone system having a plurality of individual telephone instruments and telephone lines, said apparatus comprising individual selector means associated with said telephone instruments for initiating call-selecting signals, a memory adapted to be encoded with the digits of a plurality of telephone addresses, said addresses being individually selectable by said selector means, means for generating simultaneously at least two AC tones as said call-selecting signals, and means for controlling the frequency of said AC tones in response to the digit values of the selected address.

2. A repertory call-selecting apparatus for generating AC call-selecting signals and adapted for use with an automatic call-selecting telephone system having a plurality of individual telephone instruments and telephone lines, said apparatus comprising individual selector means associated with said telephone instruments for initiating call-selecting signals, a memory of encoded telephone addresses, said addresses being individually selectable by said selector means and establishing a predetermined level for each digit in the selected address, generator for generating pulses for each digit in the selected address, means for receiving said pulses and providing a variable output in response thereto, comparison means responsive to said predetermined level and to said variable input to control the number of pulses received by said receiving means for each digit, means for generating simultaneously at least two AC tones as said AC call-selecting signals, and means responsive to the number of pulses received by said receiving means for each digit for controlling the frequency of said AC tones.

3. Apparatus as claimed in claim 2 in which said receiving means is a distributor having a plurality of output lines, and said variable output is a progressive shift in output on said lines in response to the pulses received.

4. Apparatus as claimed in claim 3 wherein said frequency controlling means comprises a capacitance bank, and the output lines of said distributor are connected to said bank, said generating means being subjected to a capacitance change to control the frequency of said AC tones in response to the output on said lines.

5. Apparatus as claimed in claim 2 wherein said generating means comprises at least two oscillators, each oscillator generating one of said AC tones, and further comprising summing means connected to the output of said oscillators for combining said AC tones, and means for transmitting said combined tones into said telephone system as said AC call-selecting signals.

6. A repertory call-selecting apparatus for generating AC call-selecting signals and adapted for use with an automatic call-selecting telephone system having a plurality of individual telephone instruments and telephone lines, said apparatus comprising individual selector means associated with said telephone instruments for initiating call-selecting signals, a memory of encoded telephone addresses, said addresses being individually selectable by said selector means and establishing a predetermined level for each digit in the selected address, a generator for generating pulses for each digit in the selected address, distributor means having a plurality of output lines, said distributor receiving said pulses and progressively shifting a selected potential condition along said distributor output lines, comparison means responsive to said predetermined level and to said shifting potential condition to terminate generation of said pulses and thereby cease further shifting of potential on said distributor output lines, means for generating simultaneously at least two AC tones as said call-selecting signals, means for varying the frequency of said AC tones, said frequency varying means being connected to said distributor output lines whereby frequencies of said AC tones for each digit in the selected address are dependent upon the potential condition on said distributor output lines when shifting ceases.

7. Apparatus as claimed in claim 6 further comprising means for applying said AC tones to said telephone system for a predetermined period of time after the frequencies of said tones have been determined.

References Cited

UNITED STATES PATENTS

| | | | |
|---|---|---|---|
| 2,760,005 | 8/1956 | Williamson et al. | 179—90 |
| 3,301,967 | 1/1967 | Plyer | 179—90 |

KATHLEEN H. CLAFFY, *Primary Examiner.*

A. H. GESS, *Assistant Examiner.*